United States Patent
Nakakuki et al.

(10) Patent No.: US 8,376,080 B2
(45) Date of Patent: Feb. 19, 2013

(54) PUMP APPARATUS, POWER STEERING APPARATUS AND ASSEMBLY METHOD OF HOUSING

(75) Inventors: Yasuhito Nakakuki, Atsugi (JP); Takumi Hisazumi, Atsugi (JP); Kunimi Yoshino, Daisen (JP); Takeshi Ito, Atsugi (JP); Yuji Shibuya, Atsugi (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 126 days.

(21) Appl. No.: 13/085,972

(22) Filed: Apr. 13, 2011

(65) Prior Publication Data

US 2012/0067664 A1    Mar. 22, 2012

(30) Foreign Application Priority Data

Sep. 21, 2010 (JP) ................................. 2010-211074

(51) Int. Cl.
*B62D 5/06* (2006.01)
(52) U.S. Cl. ....................................... 180/417; 180/439
(58) Field of Classification Search .................. 180/417, 180/421, 422, 428, 429, 439
See application file for complete search history.

(56) References Cited

U.S. PATENT DOCUMENTS

| | | | | |
|---|---|---|---|---|
| 6,568,499 | B2 * | 5/2003 | Nakazawa et al. | 180/422 |
| 7,730,993 | B2 * | 6/2010 | Watanabe | 180/422 |
| 8,020,660 | B2 * | 9/2011 | Kurata et al. | 180/417 |
| 2009/0125191 | A1 * | 5/2009 | Kurata et al. | 701/42 |

FOREIGN PATENT DOCUMENTS

JP     2008-149868 A    7/2008

* cited by examiner

*Primary Examiner* — Tony H. Winner
*Assistant Examiner* — Marc A Scharich
(74) *Attorney, Agent, or Firm* — Foley & Lardner LLP

(57) ABSTRACT

A pump apparatus includes: a first housing member which includes a first drive shaft insertion hole; a second housing member which includes a second drive shaft insertion hole; a pump drive shaft; a first abutment portion and a second abutment portion formed in the second housing member; the first and second drive shaft insertion holes being previously co-processed in a state in which the first and second housing member are relatively positioned by abutments between the first and second positioning protruding portions and the first and second abutment portions, and a joining member joining the first and second housing members in a state in which the first and second housing members are relatively positioned by the abutments of the first and second positioning protruding portions and the first and second abutment portions so as to re-create a relative position between the first and second housing members at the co-processing.

20 Claims, 13 Drawing Sheets

PUMP APPARATUS, POWER STEERING APPARATUS AND ASSEMBLY METHOD OF HOUSING

BACKGROUND OF THE INVENTION

This invention relates to a pump apparatus, a power steering apparatus, and an assembly method of a housing.

A Japanese Patent Application Publication No. 2008-149868 discloses a pump apparatus for a power steering apparatus, the pump apparatus including a pump body, a cover member, an annular cam ring fixed between the pump body and the cover member together by a plurality of bolts, a pump element disposed radially inside the cam ring, and a drive shaft arranged to drive and rotate the pump element, and inserted into drive shaft insertion holes formed in the pump body and the cover member. This drive shaft is rotatably supported in a both holding state in which the drive shaft is supported both of the pump body and the cover member.

SUMMARY OF THE INVENTION

In the above-described pump apparatus, the coaxaility of the drive shaft insertion holes of the pump body and the cover member is affected by the inclination of the drive shaft. The drive shaft insertion holes may be off (misaligned) by error of the positions of the drive shaft insertion holes, or the assembling errors of the pump body and the cover member.

It is, therefore, an object of the present invention to increase an accuracy of relative position between processing parts such as drive shaft insertion holes formed in housing members when an inner member such as the pump element is received between the pair of the housing members.

According to one aspect of the present invention, a pump apparatus comprises: a first housing member which includes a first drive shaft insertion hole extending in an axial direction; a second housing member which includes a second drive shaft insertion hole extending in the axial direction, and which is disposed to confront the first housing member; a pump element disposed between the first housing member and the second housing member, and arranged to suck and discharge a hydraulic fluid by rotating; a pump drive shaft rotatably inserted into the first drive shaft insertion hole and the second drive shaft insertion hole, and arranged to drive and rotate the pump element; a first abutment portion formed in the second housing member, and arranged to position the second housing member with respect to the first housing member in a radial direction by abutting, from a radially inside direction of the first housing member, on a first positioning protruding portion protruding from the first housing member toward the second housing member; a second abutment portion formed in the second housing member, and arranged to position the second housing member with respect to the first housing member in a swing direction of the second housing member about the first positioning protruding portion, by abutting, in the swing direction, on a second positioning protruding portion protruding from the first housing member toward the second housing member; and a joining member joining the first housing member and the second housing member, the first and second drive shaft insertion holes being previously co-processed in a state in which the first housing member and the second housing member are relatively positioned by abutments between the first and second positioning protruding portions and the first and second abutment portions, and the joining member joining the first housing member and the second housing member in a state in which the first housing member and the second housing member are relatively positioned by the abutments of the first and second positioning protruding portions and the first and second abutment portions so as to re-create a relative position between the first housing member and the second housing member at the co-processing.

According to another aspect of the invention, a power steering apparatus comprises: a power cylinder which is for a steering assist, and which includes a piston, and first and second pressure chambers formed within the power cylinder on both sides of the piston; and a reversible pump apparatus which is driven by an electromotive motor, which includes first and second suction discharge openings connected, respectively, with the first and second pressure chambers, and which is arranged to supply a hydraulic fluid selectively to the first and second pressure chambers by controlling the electromotive motor in accordance with a steering torque inputted from a steering wheel; the pump apparatus including; a first housing member which includes a first drive shaft insertion hole extending in an axial direction; a second housing member which includes a second drive shaft insertion hole extending in the axial direction, and which is disposed to confront the first housing member; a pump element disposed between the first housing member and the second housing member, and arranged to suck and discharge the hydraulic fluid by rotating; a pump drive shaft rotatably inserted into the first drive shaft insertion hole and the second drive shaft insertion hole, connected with a motor drive shaft of the electromagnetic motor, and arranged to drive and rotate the pump element; a first abutment portion formed in the second housing member, and arranged to position the second housing member with respect to the first housing member in a radial direction by abutting, from a radially inside direction of the first housing member, on a first positioning protruding portion protruding from the first housing member toward the second housing member; a second abutment portion formed in the second housing member, and arranged to position the second housing member with respect to the first housing member in a swing direction of the second housing member about the first positioning protruding portion, by abutting, in the swing direction, on a second positioning protruding portion protruding from the first housing member toward the second housing member; and a joining member joining the first housing member and the second housing member, the first and second drive shaft insertion holes being previously co-processed in a state in which the first housing member and the second housing member are relatively positioned by abutments between the first and second positioning protruding portions and the first and second abutment portions, and the joining member joining the first housing member and the second housing member in a state in which the first housing member and the second housing member are relatively positioned by the abutments of the first and second positioning protruding portions and the first and second abutment portions so as to re-create a relative position between the first housing member and the second housing member at the co-processing.

According to still another aspect of the invention, a method of assembling a housing including a first housing member, a second housing member which is disposed to confront the first housing member, and which receives an inner member between the first housing member and the second housing member, a first abutment portion formed in the second housing member, and arranged to position the second housing member with respect to the first housing member in an abutment direction perpendicular to a separating direction of the first and second housing members, by abutting, in the abutment direction, on a first positioning protruding portion protruding from the first housing member toward the second housing member, and a second abutment portion formed in the second housing member, and arranged to position the second housing member with respect to the first housing member in a swing direction of the second housing member about the first positioning protruding portion, by abutting, in the swing direction, on a second positioning protruding portion protruding from the first housing member toward the second housing member, the first and second housing members being joined while the inner member is received between the first housing members after the first housing member is formed with a first processing portion and the second housing member is formed with a second processing portion, the assembly method comprises: a first assembly step of relatively positioning the first housing member and the second housing member by abutments of the first and second positioning protruding portions and the first and second abutment portions while the first housing member and the second housing member are assembled without receiving the inner member, and joining the first and second housing members in this state; a processing step of forming the first processing portion and the second processing portion in the first and second housing members by co-processing the first and second housing members after the first assembly step; a disassembly step of disassembling the first and second housing members after the processing step; and a second assembly step of assembling the first and second housing members after receiving the inner member, abutting the first and second positioning protruding portions and the first and second abutment portions so as to re-create the relative position between the first and second housing members at the processing step, and joining the first and second housing members in this state.

DETAILED DESCRIPTION OF THE INVENTION

Figure 1:
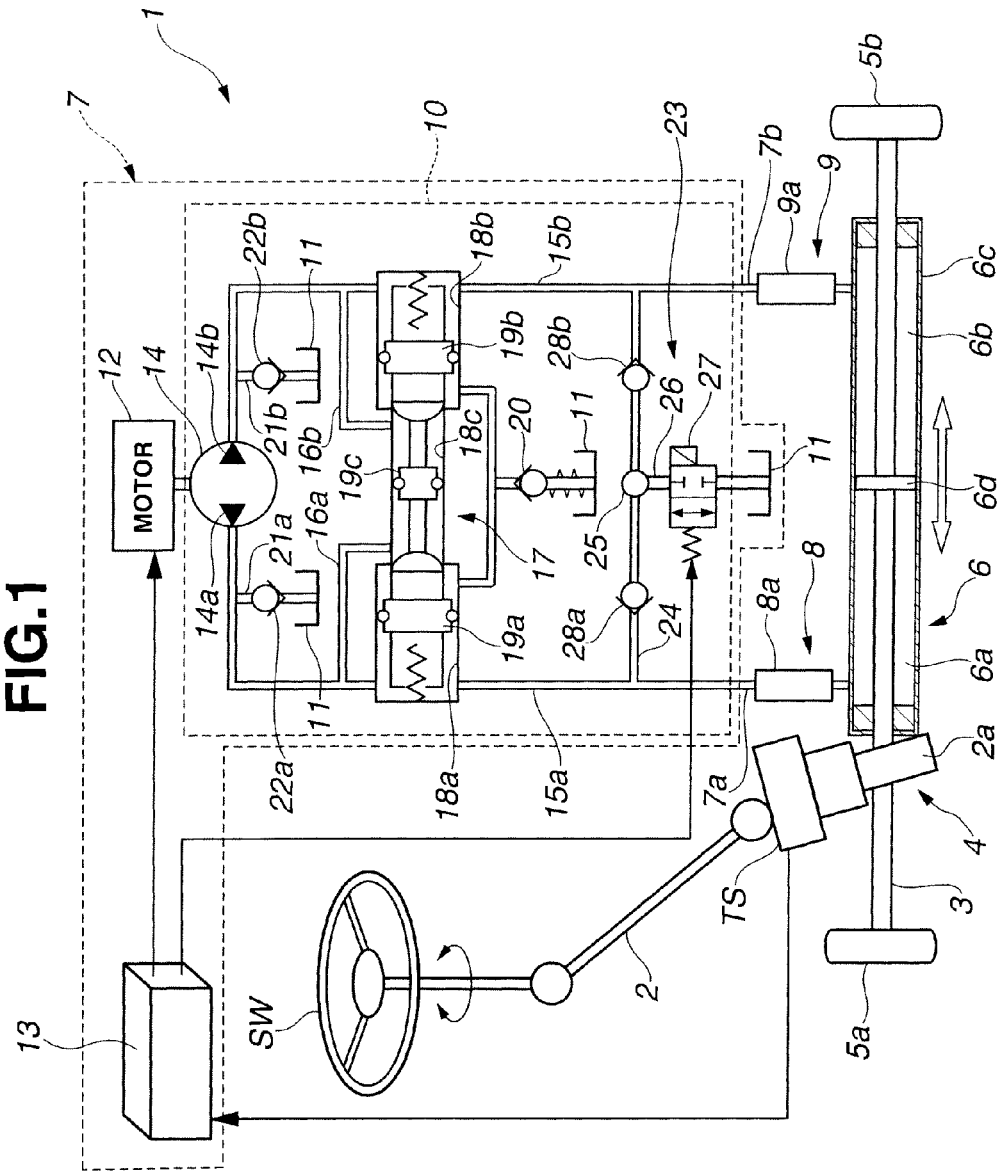
FIG. 1 is a system view showing a hydraulic power steering apparatus according to a first embodiment of the present invention.

FIG. 1 is a system view showing a hydraulic power steering apparatus according to a first embodiment of the present invention.

A power steering apparatus 1 includes a steering shaft 2 which has a one end connected with a steering wheel SW to rotate as a unit with steering wheel SW, and which is arranged to rotate based on a steering torque inputted from a driver through steering wheel SW; a torque sensor TS provided to steering shaft 2, and arranged to sense the steering torque of the driver; a rack and pinion mechanism 4 arranged to convert the rotation movement of steering shaft 2 to a movement in an axial direction of rack shaft 3; a power cylinder 6 disposed between rack and pinion mechanism 4 and steered wheels 5a and 5b, and arranged to assist the steering torque inputted from steering wheel SW by a hydraulic pressure acted to a pair of pressure chambers 6a and 6b separated within power cylinder 6; and a motor pump unit 7 arranged to supply and discharge the hydraulic pressure, to and from the pair of pressure chambers 6a and 6b, in accordance with the output of the torque sensor TS.

Rack and pinion mechanism 4 includes a pinion portion 2a formed at the other end portion of steering shaft 2, and a rack shaft 3 disposed substantially perpendicular to pinion portion 2a. Rack and pinion mechanism 4 is constituted by engaging pinion portion 2a and rack shaft 3. A direction of steered wheels 5a and 5b is varied by moving rack shaft 3 in the axial direction. Rack shaft 3 includes a rack tooth (not shown) which is formed in a predetermined region of rack shaft 3 in the axial direction, and which is engaged with pinion portion 2a of steering shaft 2. Both end portions of rack shaft 3 are connected with steered wheels 5a and 5b by known tie rods and knuckles.

Power cylinder 6 includes a cylinder tube 6c which is formed into a substantially cylindrical shape. In power cylinder 6, rack shaft 3 which serves as a piston rod is inserted into cylinder tube 6c to penetrate in the axial direction. Power cylinder 6 further includes a piston 6d which is mounted on an outer circumference of rack shaft 3, and which separates the inside of the cylinder tube 6c into a first pressure chamber 6a and a second pressure chamber 6b. First pressure chamber 6a is connected through a first piping 8 to a first suction/discharge opening 7a of motor pump unit 7. Second pressure chamber 6b is connected through a second piping 9 to a second suction/discharge opening 7b of motor pump unit 7. First and second pipings 8 and 9 include, respectively, flexible resin pipings 8a and 9a. With this, it is possible to improve the layout of the pipings, and to absorb the pulse pressure (pulsation) of the motor pump unit 7's side.

As shown in FIG. 1, motor pump unit 7 includes a reversible pump device 10 which is arranged to selectively supply the hydraulic fluid to first and second pressure chambers 6a and 6b; a reservoir tank 11 arranged to store the hydraulic fluid circulating through pump device 10; a three-phase alternative electromotive motor 12 which is arranged to drive pump device 10; and a control unit 13 arranged to control and drive the electromotive motor 12.

When the driver steers (operates the steering wheel), control unit 13 controls electromotive motor 12 based on the torque signal from torque sensor TS shown in FIG. 1, a switch signal from an ignition switch (not shown), a vehicle speed signal from a vehicle speed sensor (not shown) and so on. With this, the hydraulic fluid is supplied or discharged from first and second suction/discharge openings 7a and 7b of pump apparatus 10. Accordingly, the hydraulic fluid is selectively supplied to or discharged from first and second pressure chambers 6a and 6b of power cylinder 6, so that the steering assist force is generated in accordance with the steering torque inputted by the driver.

As shown in FIG. 1, pump device 10 includes a pump actuation section 14 arranged to perform the pump operation of pump device 10; and first and second hydraulic passages 15a and 15b connecting first and second suction/discharge ports 14a and 14b of pump actuation section 14, and first and second suction discharge openings 7a and 7b. First and second hydraulic passages 15a and 15b are connected first and second drain hydraulic passages 16a and 16b which have downstream end portions connected with reservoir tank 11.

Each of first and second drain hydraulic passages 16a and 16b is arranged to be opened or closed by a control valve 17 arranged to operate in accordance with a pressure difference between first and second hydraulic passages 15a and 15b. In a portion of first and second drain hydraulic passages 16a and 16b which are downstream of control valve 17, there is provided a relief valve 20 arranged to allow a flow to reservoir tank 11. That is, first and second drain hydraulic passages 16a and 16b are connected through control valve 17 and relief valve 20 to reservoir tank 11.

Control valve 17 includes a sliding hole 18c connected to first and second drain hydraulic passages 16a and 16b; first and second valve holes 18a and 18b which are formed on both sides of sliding hole 18c in the axial direction, and which are connected, respectively, with first and second hydraulic passages 15a and 15b; first and second valve elements 19a and 19b which are received, respectively, in first and second valve holes 18a and 18b to be slid in the axial direction, and which are arranged to open and close first and second drain hydraulic passages 16a and 16b; and a piston 19c which is slidably received in sliding hole 18c in the axial direction, and which is arranged to selectively open and close valve elements 19a and 19b based on the pressure difference between first and second hydraulic passages 15a and 15b.

Control valve 17 is a normally-closed type. In control valve 17, first and second valve elements 19a and 19b are urged in a valve closing direction (the piston 19c's side) by spring forces of coil springs. When pump apparatus 10 is not actuated, first and second valve elements 19a and 19b close first and second drain passages 16a and 16b.

On the other hand, when the pressure of first hydraulic passage 15a is larger than the pressure of second hydraulic passage 15b by the actuation of pump apparatus 10, piston 19c presses second valve element 19b in a valve opening direction against the spring force of the coil spring. With this, second hydraulic passage 15b is connected with reservoir tank 11 through relief valve 20. In this case, first valve element 19a is closed, and the connection between second hydraulic passage 15a and reservoir tank 11 through control valve 17 is shut off.

On the other hand, when the pressure of second hydraulic passage 15b is larger than the pressure of first hydraulic passage 15a by the actuation of pump apparatus 10, piston 19c presses first valve element 19a in the valve opening direction against the spring force of the coil spring. With this, first hydraulic passage 15a is connected with reservoir tank 11 through relief valve 20. In this case, second valve element 19b is closed, and the connection between second hydraulic passage 15b and reservoir tank 11 through control valve 17 is shut off.

In this way, control valve 17 selectively opens and closes first and second drain hydraulic passages 16a and 16b in accordance with the pressure difference between the first and second hydraulic passages 15a and 15b. With this, it is possible to improve the discharge efficiency of the hydraulic fluid in the pressure chamber which is the low pressure side of first and second pressure chambers 6a and 6b of power cylinder 6, and to rapidly decrease the pressure.

Portions of first and second hydraulic passages 15a and 15b which are on the pump actuation portion 14's side of the connection portions between first and second hydraulic passages 15a and 15b and first and second drain hydraulic passages 16a and 16b are connected, respectively, through first and second supply hydraulic passages 21a and 21b to reservoir tank 11. In these first and second supply hydraulic passages 21a and 21b, there are provided first and second suction check valves 22a and 22b arranged to allow flows of the hydraulic fluid which are sucked from reservoir tank 11. These first and second suction check valves 22a and 22b are arranged to prevent reverse flows of the hydraulic fluid to reservoir tank 11, and to supply the deficiency in first and second hydraulic passages 15a and 15b from reservoir tank 11.

Moreover, between first and second hydraulic passages 15a and 15b, there is provided a fail-safe mechanism 23. This fail-safe mechanism 23 includes a connection hydraulic passage 24 connecting first and second hydraulic passages 15a and 15b; a connection portion 25 located at a substantially central position of connection hydraulic passage 24; a third drain hydraulic passage 26 connecting connection portion 25 and reservoir tank 11; a solenoid switching valve 27 which is a normally open type, which is provided in third drain hydraulic passage 26, and which is arranged to open and close based on a command from control unit 13; and first and second check valves 28a and 28b which are provided in connection hydraulic passage 24 on both sides of connection portion 25 to sandwich connection portion 25 of connection hydraulic passage 24, and which are arranged to allow flows of the hydraulic fluid flowing to connection portion 25.

Solenoid switching valve 27 is closed in the normal state by the command from control unit 13. Solenoid switching valve 27 is opened in a fail state, that is, system malfunction, so that the hydraulic fluid can be moved between first and second hydraulic chambers 6a and 6b. With this, it is possible to perform a manual steering by the steering force of the driver even in the fail state.

Figure 2:
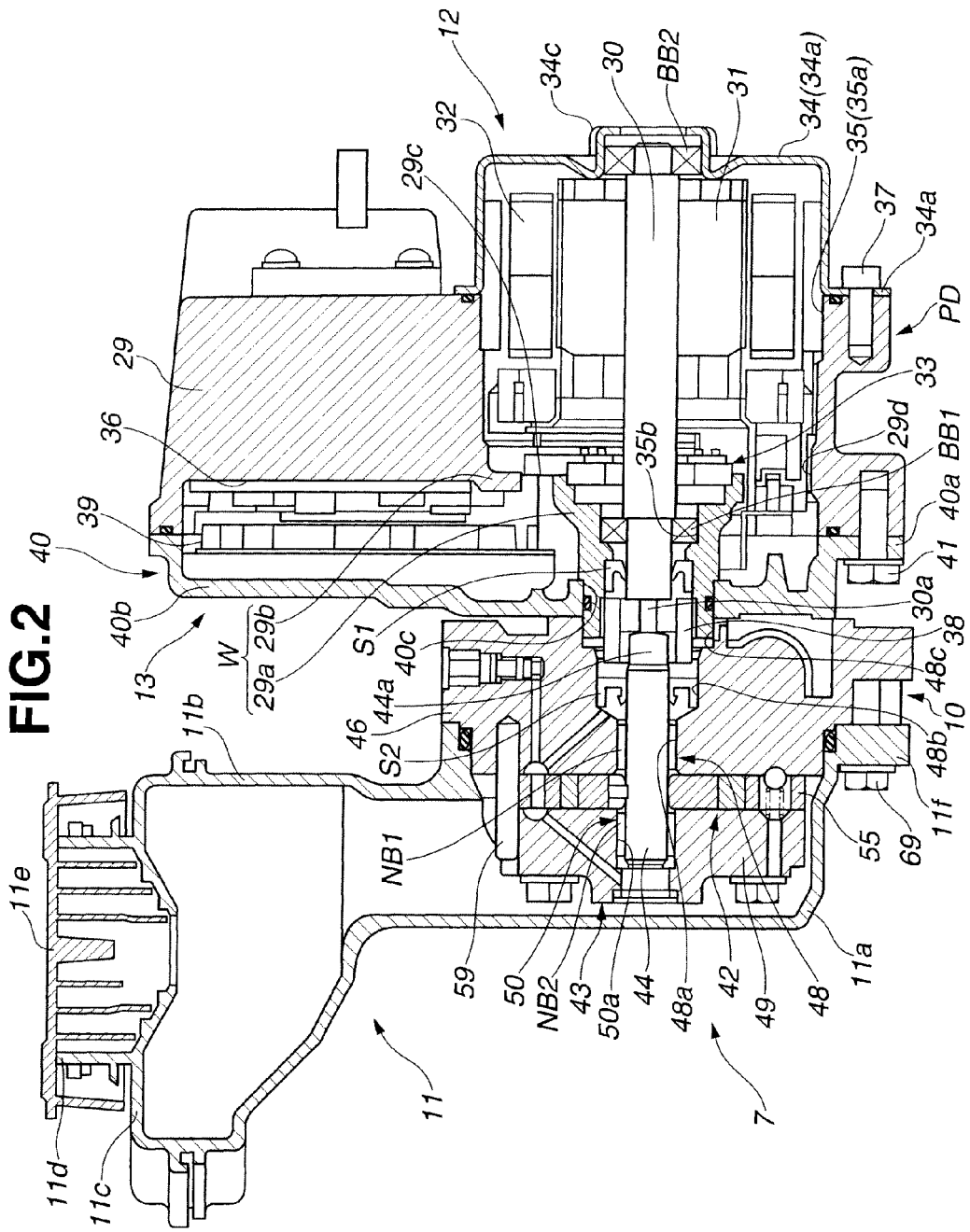
FIG. 2 is a sectional view taken along an axial direction of a motor pump unit of FIG. 1.

Moreover, as shown in FIG. 2, in motor pump unit 7, reservoir tank 11 is disposed on one side of pump apparatus 10 in the axial direction, and a pump drive apparatus PD including electromotive motor 12 and control unit 13 is disposed on the other side of pump apparatus 10.

A housing 29 of pump drive apparatus PD includes a motor drive shaft receiving hole 35 which is formed to penetrate housing 29 in the axial direction, and which receives motor drive shaft 30 with a rotor 31 and a stator 32; and a control board receiving recessed portion 36 recessed on an end surface of housing 29 on the pump apparatus 10's side in the axial direction so as to surround an outer circumference of motor drive shaft receiving hole 35. Housing 29 of pump drive apparatus PD is formed by integrally molding by aluminum die casting to form these motor drive shaft receiving hole 35 and control board receiving recessed portion 36.

Motor drive shaft 30 with rotor 31 and stator 32 are received motor drive shaft receiving hole 35, and a motor cover 34 which is a cylindrical shape with a cover covers an opening of motor drive shaft receiving hole 35 on the rotor receiving portion 35a's side (described later), so that electromotive motor 12 is constituted. On the other hand, control board 39 is received in control board receiving recessed portion 36, and a control unit cover 40 covers an opening of control board receiving recessed portion 36, so that control unit 13 is constituted. That is, electromotive motor 12 and control unit 13 shares housing 29, so that electromotive motor 12 and control unit 13 are integrated as pump drive apparatus PD. With this, it is possible to save troublesome work (save time and effort) to connect electromotive motor 12 and control unit 13, and to improve the workability of the assembly operation and the productivity.

Motor drive shaft receiving hole 35 includes a rotor receiving portion 35a which has a relatively large diameter, and which is formed to open to the other end side (non-pump apparatus 10's side) of the axial direction; and a first bearing receiving portion 35b which has a diameter smaller than the diameter of rotor receiving portion 35a, and which extends to penetrate control board receiving recessed portion 36 from rotor receiving portion 35a. Between motor drive shaft receiving hole 35 and control board receiving recessed portion 36, there is formed a partition wall W including a cylindrical portion 29a which is a protruding portion to position the electromotive motor side, and which is a circumferential wall of first bearing receiving portion 35b, and a stepped wall portion 29b formed between rotor receiving portion 35a and first bearing receiving portion 35b.

Motor cover 34 is formed by bending a thin plate into a substantially cylindrical shape with a cover. Motor cover 34 includes a flange portion 34a formed on an edge of the opening end of motor cover 34. This flange portion 34a is mounted and fixed on the open end surface of rotor receiving portion 35a of housing 29 by a motor cover mounting bolt 37.

The cylindrical rotor 31 is mounted on motor drive shaft 30 by a key (not shown) and so on to prevent the rotation. The cylindrical stator 32 is disposed radially outside rotor 31 with a predetermined clearance in a noncontact state. These rotor 31 and stator 32 are received within the inside space of motor cover 34 and rotor receiving portion 35a of housing 29.

Motor cover 34 includes a second bearing receiving portion 34c which is located at a substantially central position of a cover portion 34b, which has an emboss shape, and which is recessed toward motor housing 29. A second ball bearing BB2 is received and held in second bearing receiving portion 34c. A first ball bearing BB1 is received and held by first bearing receiving portion 35b of motor housing 29. Both end portions of motor drive shaft 30 are rotatably supported by first ball bearing BB1 and second ball bearing BB2. A motor side seal member S1 is received in a portion of first bearing receiving portion 35b of motor housing 29 which is on the pump apparatus 10's side of first ball bearing BB1. Motor side seal member S1 seals between the inner circumference surface of cylindrical portion 29a and the outer circumference surface of motor drive shaft 30. A resolver 33 is disposed at a central portion of motor drive shaft 30 in the axial direction between first ball bearing BB1 and rotor 31. Resolver 33 is arranged to sense a rotation angle of motor drive shaft 30.

A length of a portion of motor drive shaft 30 on the pump apparatus 10's side is set to a length to extend over an entire portion of cylindrical portion 29a in the axial direction, that is, a length to extend to a portion near an end of cylindrical portion 29a on the pump apparatus 10's side. One end portion of motor drive shaft 30 on the pump apparatus 10's side penetrates control board receiving recessed portion 36 with cylindrical portion 29a. A flat connection portion 30a is formed at the one end portion of motor drive shaft 30 on the pump apparatus 10's side. This connection portion 30a passes through a shaft center of motor drive shaft 30. This connection portion 30a is mounted in a shaft coupling 38, so that connection portion 30a and shaft coupling 38 are connected. This shaft coupling 38 is an Oldham coupling.

Control board 39 of control unit 13 includes various circuits for controlling and driving electromotive motor 12. Control board 39 is electrically connected with stator coil 32b and resolver 33 through first and second through holes 29c and 29d formed in a stepped wall portion 29b.

Control unit cover 40 includes a flange portion 40a formed on an edge of the open end surface of control unit cover 40. This flange portion 40a is overlapped with the opening end surface of control board receiving recessed portion 36 of motor housing 29. This flange portion 40a is fixed to the open end surface of control board receiving recessed portion 36 by a mounting bolt 41. Moreover, control unit cover 40 includes a through hole 40c formed in a bottom wall portion 40b. Cylindrical portion 29a of motor housing 29 is inserted through through hole 40c to protrude to the outside of control unit cover 40.

On the other hand, pump apparatus 10 is an internal gear pump. Pump apparatus 10 includes a pump element 42 which is arranged to suck and discharge the hydraulic fluid in accordance with the rotation, and which is an inner member (inner received member); a pump housing (housing) 43 which receives pump element 42; and a pump drive shaft 44 which is connected through shaft coupling 38 with motor drive shaft 30, and which is arranged to drive and rotate pump element 42 by a torque transmitted from motor drive shaft 30. A one end of reservoir tank 11 is mounted on an outer circumference surface of pump housing 43. A part of pump apparatus 10 is submerged in the hydraulic fluid within reservoir tank 11.

Reservoir tank 11 includes a first cylindrical portion 11a receiving a part of pump apparatus 10, and a second cylindrical portion 11b which is connected with first cylindrical portion 11a, and which extends from first cylindrical portion 11a in the upward direction. At a substantially central portion of a cover portion 11c of second cylindrical portion 11b, there is formed a cylindrical opening portion 11d for injecting the hydraulic fluid. A detachable (removable) cap 11e is mounted on cylindrical opening portion 11d.

Reservoir tank 11 includes a flange portion 11f formed on an edge of an opening end of first cylindrical portion 11a. This flange portion 11f is mounted and fixed on a pump body 46 (described later) of pump housing 43 by reservoir tank mounting bolt 69.

Figure 3:
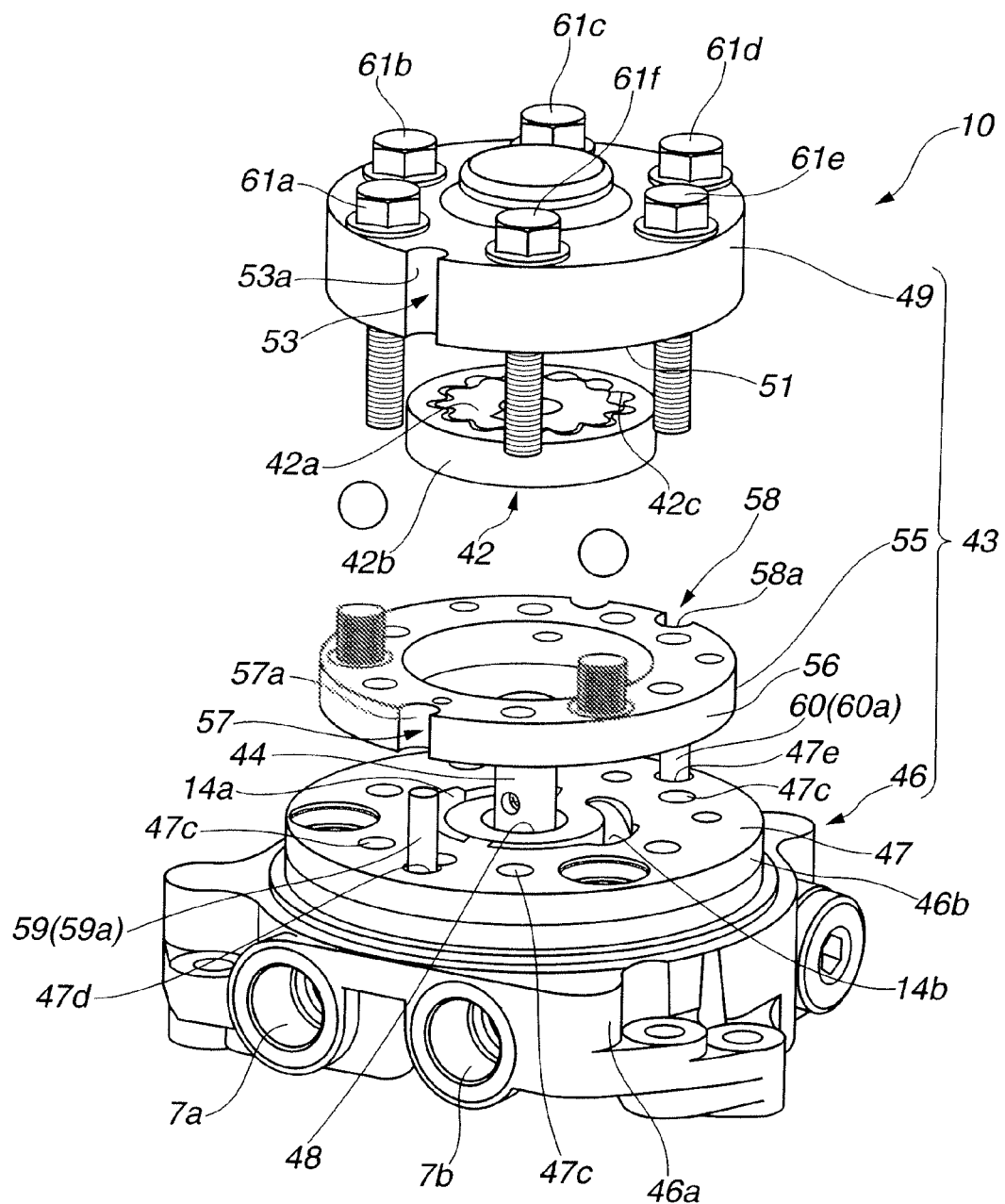
FIG. 3 is an exploded perspective view showing the pump apparatus of FIG. 2.
Figure 4:
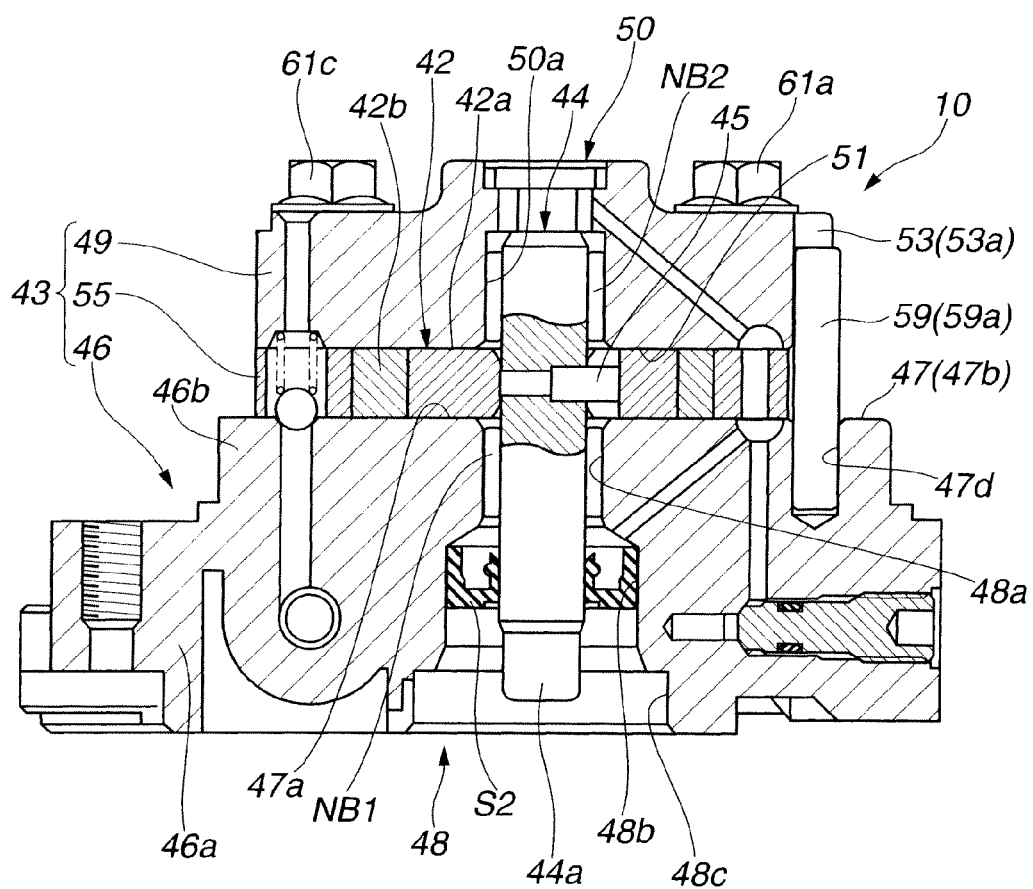
FIG. 4 is a sectional view taken along an axial direction of the pump apparatus of FIG. 2.
Figure 5:
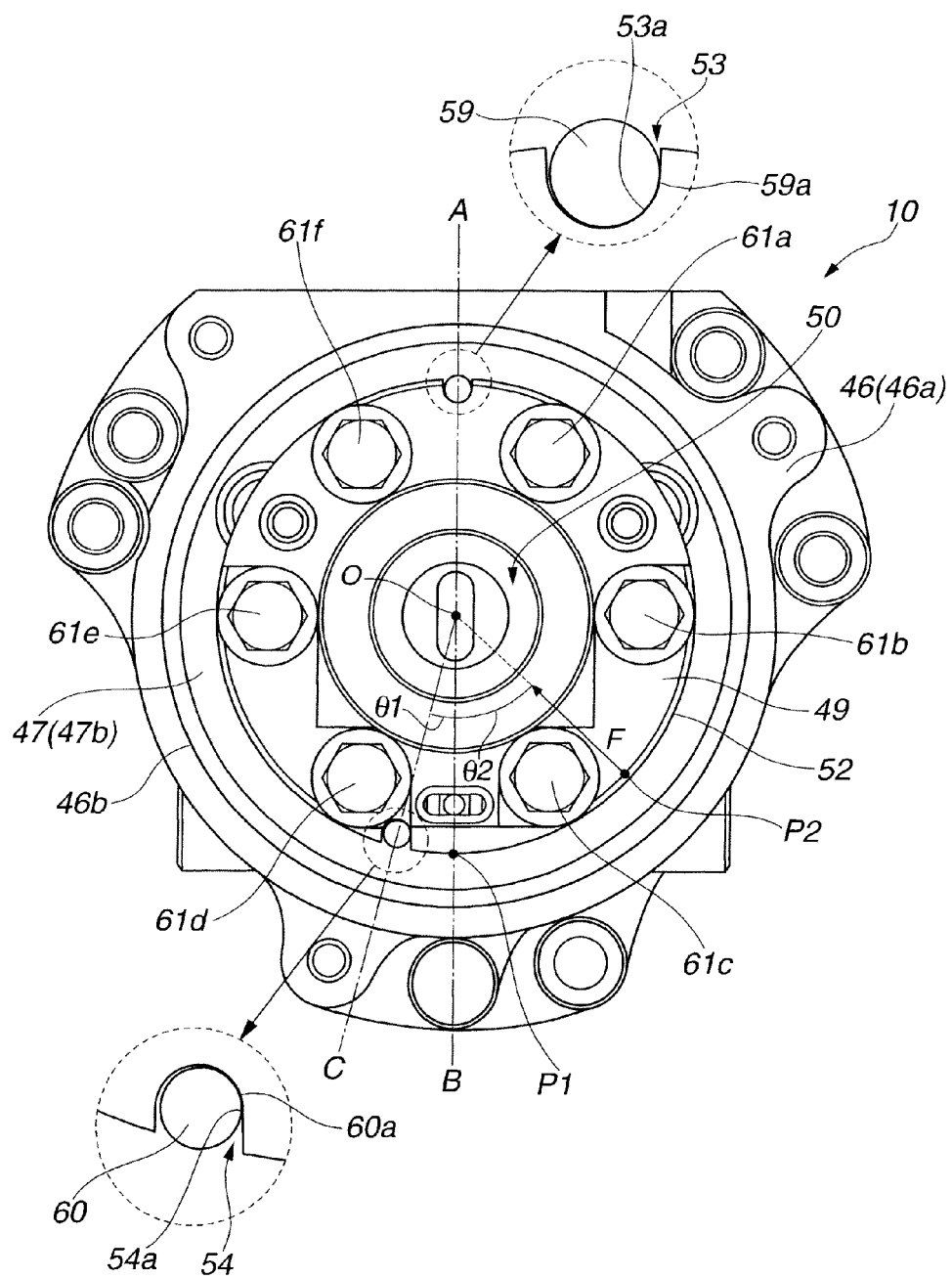
FIG. 5 is a front view showing the pump apparatus of FIG. 2.

FIGS. 3-5 are views showing a pump apparatus 10 shown in FIG. 2. FIG. 3 is an exploded perspective view showing pump apparatus 10. FIG. 4 is a sectional view taken along the axial direction of pump apparatus 10. FIG. 5 is a front view showing pump apparatus 10.

As shown in FIGS. 3 and 4, pump element 42 includes an inner rotor 42a which is fixed on the outer circumference of pump drive shaft 44 by pin 45 to prevent the rotation relative to pump drive shaft 44, and which includes an external teeth formed on an outer circumference surface of inner rotor 42a; and an annular outer rotor 42b which is rotatably received radially outside inner rotor 42a within pump housing 43, and which includes an internal teeth formed on an inner circumference surface of outer rotor 42b, and engaged with the external teeth of inner rotor 42a.

As is well known in the art, the external teeth of inner rotor 42a has a pitch identical to that of internal teeth of outer rotor 42b. The number of the internal teeth of outer rotor 42b is larger than the number of the external teeth of inner rotor 42a by one. A part of inner rotor 42a is engaged with a part of outer rotor 42b in the circumferential direction so that inner rotor 42a and outer rotor 42b are eccentric to each other, so that there are formed a plurality of pump chambers 42c which are located between the external teeth of inner rotor 42a and the internal teeth of outer rotor 42b, and which have different sizes, and different shapes.

Pump drive shaft 44 drives and rotates pump element 42 by the torque transmitted from electromotive motor 12, so that pump chambers 42c are moved in the circumferential direction to decrease or increase the volumes of pump chambers 42c. With this, pump chambers 42c suck the hydraulic fluid through one of first and second suction/discharge ports 14a and 14b described later, pressurize the sucked hydraulic fluid, and discharge from the other of first and second suction discharge ports 14a and 14b. That is, pump element 42, and first and second suction discharge ports 14a and 14b constitute pump actuation section 14 (cf. FIG. 1) described above.

Pump housing 43 includes a pump body (first housing member) 46 which is molded by aluminum die casting, and which is disposed to be abutted on the outer surface of control unit cover 40; a pump cover (second housing member) 49 which is molded by aluminum die casting into a substantially flat cylindrical shape, which is disposed on a side of pump body 46 opposite to control unit cover 40 to confront the side of pump body 46 opposite to control unit cover 40; and a cam ring 55 which is made from aluminum alloy, which is molded by powder metallurgy method into a substantially annular shape, and which is held and fixed to be sandwiched by pump body 46 and pump cover 49.

Pump body 46 includes a base portion 46a which is formed into a substantially flat block shape, and which is seated and fixed on control unit cover 40 by bolts (not shown); a circular protruding portion 46b which is formed into a substantially cylindrical shape, which protrudes from base portion 46a toward pump cover 49, and which includes an outer circumference surface on which reservoir tank 11 is mounted; and a first drive shaft insertion hole 48 which penetrates along a shaft center of circular protruding portion 46b.

As shown in FIG. 3, pump body 46 includes first and second suction/discharge ports 14a and 14b which are formed in an inner side surface 47 (a tip end surface of circular protruding portion 46b) of pump body 46, which are located at radial positions to correspond to pump chambers 42c of pump element 42, which are formed into substantially crescent shapes extending in the circumferential direction, and which are substantially symmetrical with each other with respect to first drive shaft insertion hole 48. On the other hand, there are formed first and second suction/discharge openings 7a and 7b which are opened in an outer side portion of base portion 46a, and which are connected with first and second suction discharge ports 14a and 14b. These first and second suction/discharge openings 7a and 7b are connected through first and second pipings 8 and 9 shown in FIG. 1 to power cylinder 6 shown in FIG. 1.

As shown in FIG. 4, first drive shaft insertion hole 48 is formed into a substantially circular shape with stepped portions. First drive shaft insertion hole 48 includes a first bearing receiving portion 48a which is formed in an end portion of first drive shaft insertion hole 48 that is on the circular protruding portion 46b's side, and which receives a first needle bearing NB1 arranged to support pump drive shaft 44; a seal receiving portion 48b which is formed at a substantially central portion of first drive shaft insertion hole 48 in the axial direction, which has a diameter larger than the diameter of first bearing receiving portion 48a, and which receives a pump side seal member S2 arranged to seal a portion between pump drive shaft 44 and pump body 46; and a large diameter portion 48c which is formed in an end portion of first drive shaft insertion hole 48 which is on the base portion 46a's side, which has a diameter larger than the diameter of seal member receiving portion 48b, which is opened in the bottom surface of base portion 46a, and which serves as a positioning hole for receiving cylindrical portion 29a on the motor control apparatus MC's side.

On the other hand, pump cover 49 includes a second drive shaft insertion hole 50 which is formed at a central portion of pump cover 49, which is formed into a substantially circular shape that extends in the axial direction of pump apparatus 10, and that has stepped portion, and which is formed to penetrate pump cover 49 to be substantially coaxial with first drive shaft insertion hole 48 of pump body 46. Second drive shaft insertion hole 50 includes a second bearing receiving portion 50a which is opened to pump body 46, which has a shape to increase the diameter, and which receives a second needle bearing NB2. This second needle bearing NB2 and first needle bearing NB1 of pump body 46 rotatably support pump drive shaft 44. That is, pump drive shaft 44 is inserted into first drive shaft insertion hole 48 of pump body 46 and second drive shaft insertion hole 50 of pump cover 49. Portions of pump drive shaft 44 on both sides of pump element 42 are rotatably supported by first and second needle bearings NB1 and NB2, that is, in both holding state. Therefore, an inner circumference surface of first bearing receiving portion 48a of first drive shaft insertion hole 48 and an inner circumference surface of second bearing receiving portion 50a of second drive shaft insertion hole 50 are previously co-processed in a state in which pump body 46 and pump cover 49 are assembled, so as to ensure coaxiality between first bearing receiving hole 48a and second bearing receiving hole 50a.

As shown in FIG. 2, the tip end portion of cylindrical portion 29a of motor housing 29 is received in large diameter portion 48c of first drive shaft insertion hole 48 of pump body 46, so that pump drive shaft 44 and motor drive shaft 30 are relatively positioned in the radial direction. Moreover, pump drive shaft 44 includes a flat connection portion 44a which is formed at an end portion of pump drive shaft 44 that is on the pump body 46's side, and which pass through a shaft center of pump drive shaft 44. This connection portion 44a is mounted in shaft coupling 38 within cylindrical portion 29a. With this, pump drive shaft 44 is connected through shaft coupling 38 to motor drive shaft 30. Besides, the inner circumference surface of large diameter portion 48c of first drive shaft insertion hole 48, the inner circumference of first bearing receiving portion 48a, and the inner circumference surface of second bearing receiving portion 50a are co-processed to ensure the coaxiality between pump drive shaft 44 and motor drive shaft 30.

As mentioned above, pump body 46 and pump cover 49 are molded by aluminum die casting. As shown in FIG. 4, inner side surfaces 47 and 51 of pump body 46 and pump cover 49 which confront each other are slid, respectively, on both axial end surfaces of inner rotor 42a and outer rotor 42b with minute clearances at the actuation of pump apparatus 10. Accordingly, inner side surfaces 47 and 51 of pump body 46 and pump cover 49 which confront each other are machined as finish machining (finish processing) after the molding to ensure the accuracy of the side clearance.

As shown in FIGS. 4 and 5, pump cover 49 and cam ring 55 have outside diameter smaller than an outside diameter of inner side surface 47 of pump body 46. Inner side surface 47 of pump body 46 includes a pump element sliding surface 47a which is an inner circumference portion of inner side surface 47 of pump body 46, which is located near pump element 42 within pump housing 43 to confront pump element 42. On the other hand, the outer circumference portion of inner side surface 47 of pump body 46 confronts the outside of pump housing 43 as a stepped machine reference surface 47b which is a reference when first and second drive shaft insertion holes 48 and 50 are co-processed as described later. That is, pump element sliding surface 47a and machined reference surface 47b which need relatively high flatness are set to the same plane so that pump element sliding surface 47a and machined reference surface 47b are simultaneously machined. Accordingly, it is possible to suppress the decrease of the productivity of pump apparatus 10, to form machined reference surface 47b by the accuracy identical to the accuracy of pump element sliding surface 47a, and to ensure the parallelism between pump element sliding surface 47a and machine reference surface 47b.

Furthermore, as shown in FIG. 3, there are formed first and second pin insertion holes 47d and 47e formed on inner side surface 47 of pump body 46. Moreover, cylindrical first and second positioning pins (first and second positioning protruding portions) 59 and 60 protrude from pump body 46 toward pump cover 49. First and second positioning pins 59 and 60 are tightly fixed into first and second pin insertion holes 47d and 47e by the press fit.

In the front view shown in FIG. 5, first and second positioning pins 59 and 60 are disposed at radial positions identical to the radial position of outer circumference surface 52 of pump cover 49, at circumferential positions which are offset from each other to be asymmetrical with respect to pump drive shaft 44. That is, second positioning pin 60 is disposed at a position which is offset by angle θ in the clockwise direction of FIG. 5 from a position P1 at which an imaginary line AOB passing through the center of first positioning pin 59 and the center O of second drive shaft insertion hole 50 crosses the outer circumference surface 52 of pump cover 49 on the side opposite to first positioning pin 59.

On the other hand, pump cover 49 includes first and second pump cover side positioning grooves 53 and 54 which are formed on outer circumference surface 52 of pump cover 49 at circumferential positions to correspond to first and second positioning pins 59 and 60, which have substantially U-shaped sections having widths slightly larger than diameters of first and second positioning pins 59 and 60, and which extend in an entire region of pump cover 49 in the axial direction. Similarly, cam ring 55 includes first and second cam ring side positioning grooves 57 and 58 which are formed on outer circumference surface 56 of cam ring 55 (cf. FIG. 3). Entire regions of outer wall surfaces 53a, 54a, 57a and 58a of these first and second pump cover side positioning grooves 53 and 54 and first and second cam ring side positioning grooves 57 and 58 are machined after the above-described molding.

As shown in FIGS. 3 and 5, pump body 46, pump cover 49, and cam ring 55 are tightened and fixed together by six housing tightening bolts (joining members) 61a-61f in a state in which pump body 46, pump cover 49, and cam ring 55 are positioned in a direction perpendicular to the pump drive shaft 44, that is, in the radial direction of pump body 46, by mounting (fitting) between positioning grooves 53, 54, 57 and 58, and first and second positioning pins 59 and 60. That is, housing tightening bolts 61a-61f are inserted through bolt insertion holes which are formed in pump cover 49 and cam ring 55 at identical pitch in the circumferential direction, and screwed into a plurality of screw holes 47c opened in inner side surface 47 of pump body 46. The bolt insertion holes (not shown) formed in pump cover 49 and cam ring 55 have diameters larger than shaft portions of housing tightening bolts 61a-61f so as to form radial clearances between the bolt insertion holes and housing tightening bolts 61a-61f.

The axial end surfaces of inner rotor 42a and outer rotor 42b are slid with the minute side clearances at the actuation of pump apparatus 10, on inner side surfaces 47 and 51 of pump body 46 and pump cover 49 which confront each other. Accordingly, it is preferable to improve a squareness of pump drive shaft 44 to inner side surfaces 47 and 51 of pump body 46 and pump cover 49 for improving the mechanical efficiency of pump apparatus 10 by decreasing the sliding resistance, and for uniformalizing (equalizing) the discharge characteristics in the forward rotation and in the reverse rotation of pump apparatus 10 which rotates in the forward direction and in the reverse direction in accordance with the steering direction.

Pump drive shaft 44 is supported in the both holding state by pump body 46 and pump cover 49. Accordingly, it is necessary to assemble pump apparatus 43 while pump body 46 and pump cover 49 are relatively positioned so that the center of first bearing receiving portion 48a of pump body 46 substantially corresponds to the center of second bearing receiving portion 50a of pump cover 49 at the reassembly after the co-processing of first bearing receiving portion 48a of first drive shaft insertion hole 48 and second bearing receiving portion 50a of second drive shaft insertion hole 50, for improving the squareness of pump drive shaft 44 with respect to pump body 46 and pump cover 49.

However, there are clearances between first and second positioning pins 59 and 60, and first and second pump cover side positioning grooves 53 and 54 which are arranged to position pump body 46 and pump cover 49. Accordingly, pump housing 43 may be assembled in a state in which the centers of first and second bearing receiving portions 48a and 50a are offset (misaligned) by this clearance. Therefore, the squareness of pump drive shaft 44 may be decreased. In this case, it is possible to improve the coaxiality of first and second bearing receiving portions 48a and 50a by forming first and second positioning pins 59 and 60, and first and second pump cover side positioning grooves 53 and 54 at extreme high accuracy. However, this is not preferable due to the extreme decrease of the productivity, and the increase of the cost.

In the pump apparatus according to the embodiment, as shown in the enlarged view shown in FIG. 5, pump body 46 and pump cover 49 are assembled so that first and second positioning pins 59 and 60 are mounted (fit) in first and second pump cover side positioning grooves 53 and 54. Then, pump cover 49 is eccentric (biased) with respect to pump body 46 in the direction of an urging force F by applying urging force F shown in FIG. 5 to pump cover 49. In this state, pump body 46 and pump cover 49 are joined by housing tightening bolts 61a-61f (that is, press-assembly). In the front view shown in FIG. 5, the direction of urging force F is a direction to center O of drive shaft insertion hole 50 from a position P2 which is offset by a predetermined angle θ2 with respect to the above-described position P1 of outer circumference surface 52 of pump cover 49 to the side opposite to the second positioning pin 60's side, that is, a direction inclined by predetermined angle θ2 with respect to imaginary line AOB.

With this, outer wall surfaces 53a and 54a of first and second pump cover side positioning grooves 53 and 54 are abutted on cylindrical outer circumference surfaces 59a and 60a of first and second positioning pins 59 and 60 in the direction of urging force F. Accordingly, the relative position between pump body 46 and pump cover 49 is uniquely determined. That is, outer wall surface 53a of first pump cover side positioning groove 53 is abutted from the inside on the first positioning pin 59 in the radial direction of pump body 46 which is the abutment direction perpendicular to the separating direction between pump cover 49 and pump body 46, so that pump cover 49 is relatively positioned in the radial direction with respect to pump body 46. On the other hand, outer wall surface 54a of second pump cover side positioning groove 54 is abutted on the second positioning pin 60 in the swing direction of pump cover 49 about (around) first positioning pin 59, so that pump cover 49 and pump body 46 are relatively positioned in that swing direction.

In the assembly of pump housing 43, first and second drive shaft insertion holes 48 and 50 are co-processed in a state in which pump housing 43 is assembled without receiving (housing) pump element 42 and pump drive shaft 44. Then, pump housing 43 is disassembled once, and the reassembly is performed with the assemblage of pump element 42 and pump drive shaft 44 (while pump element 42 and pump drive shaft 44 are received in pump housing 43). In this case, pump housing 43 is press-assembled at the reassembly after the co-processing in a condition identical to the condition at the assembly operation before the co-processing, so that the relative position between pump body 46 and pump cover 49 is substantially re-created.

Figure 6:
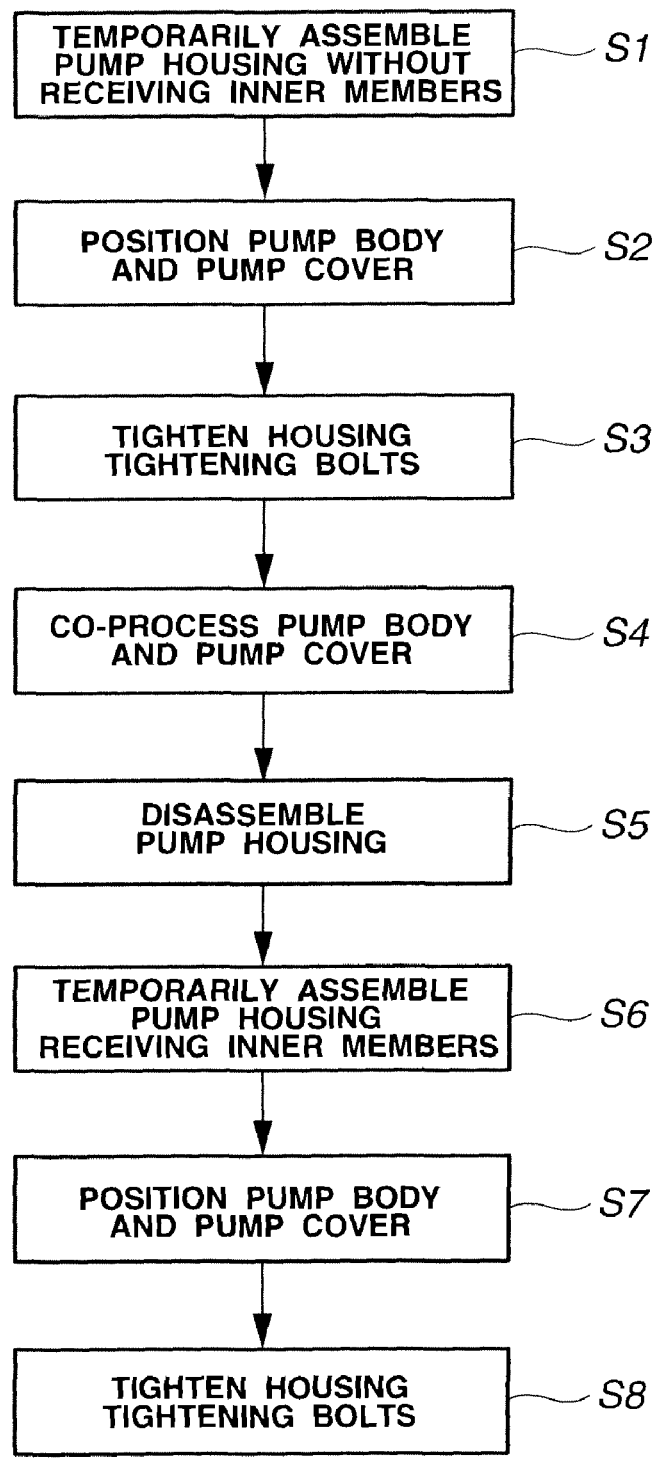
FIG. 6 is a flowchart an assembly process of the pump apparatus of FIG. 2.
Figure 7:
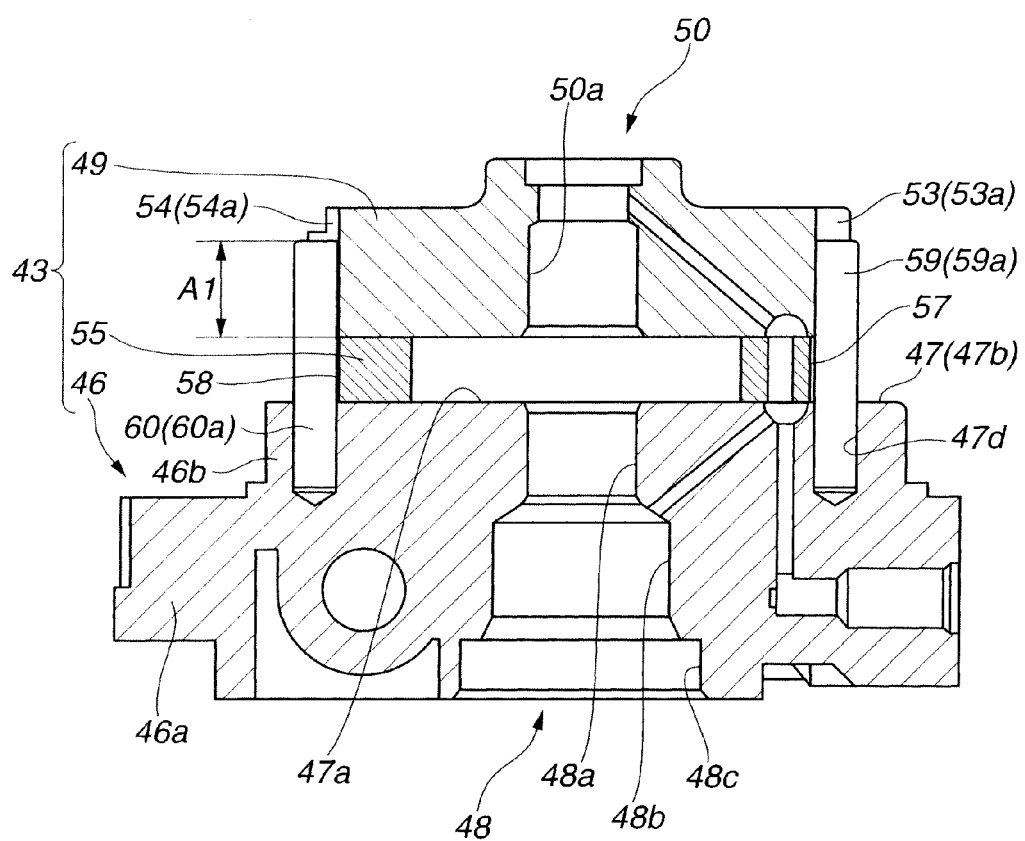
FIG. 7 is a sectional view taken along an imaginary line AOC of FIG. 5, and showing a state in which the pump housing was assembled without receiving a pump element and a pump drive shaft shown in FIG. 2.
Figure 8:
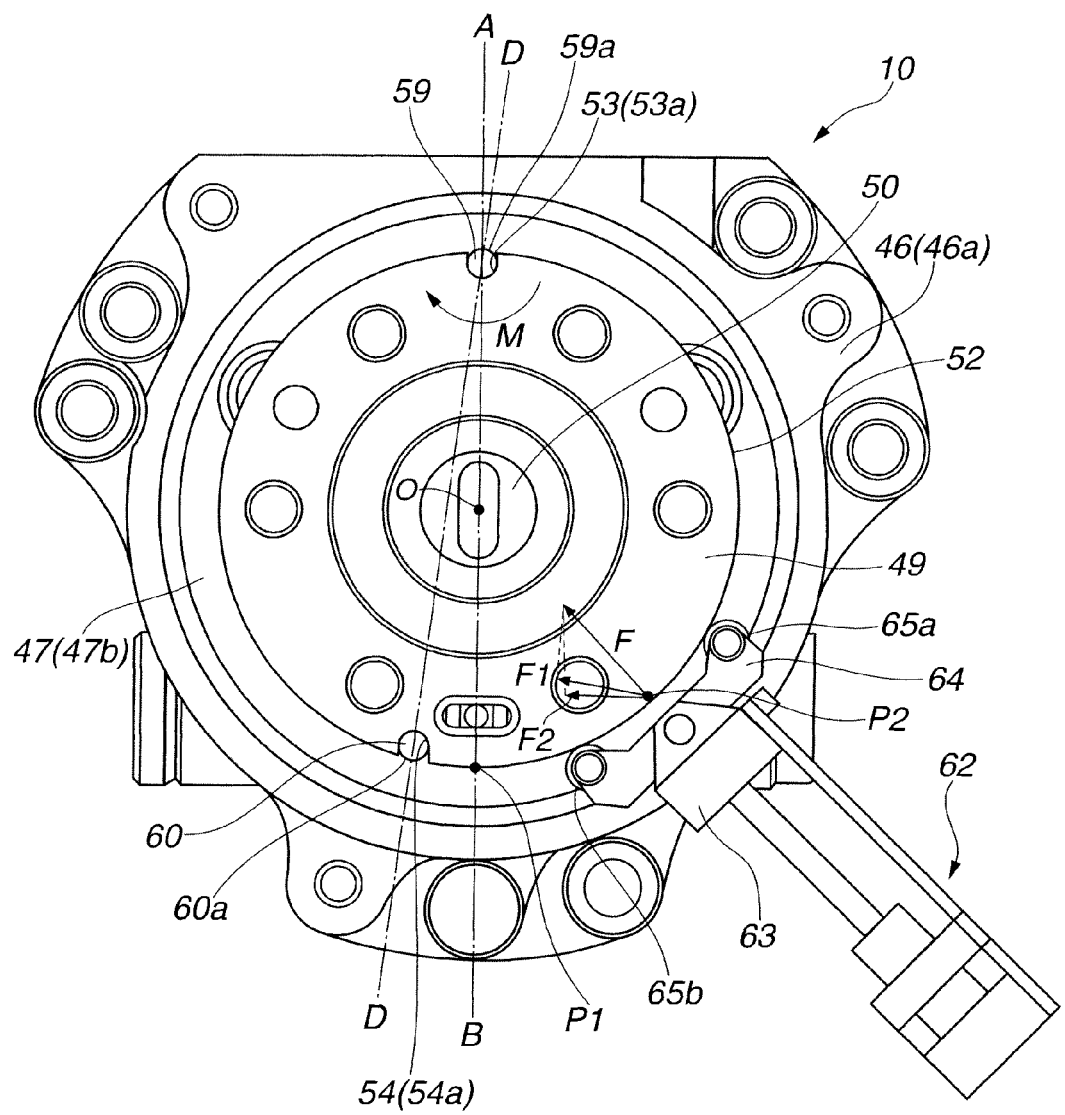
FIG. 8 is a front view showing the pump housing shown in FIG. 7.
Figure 9:
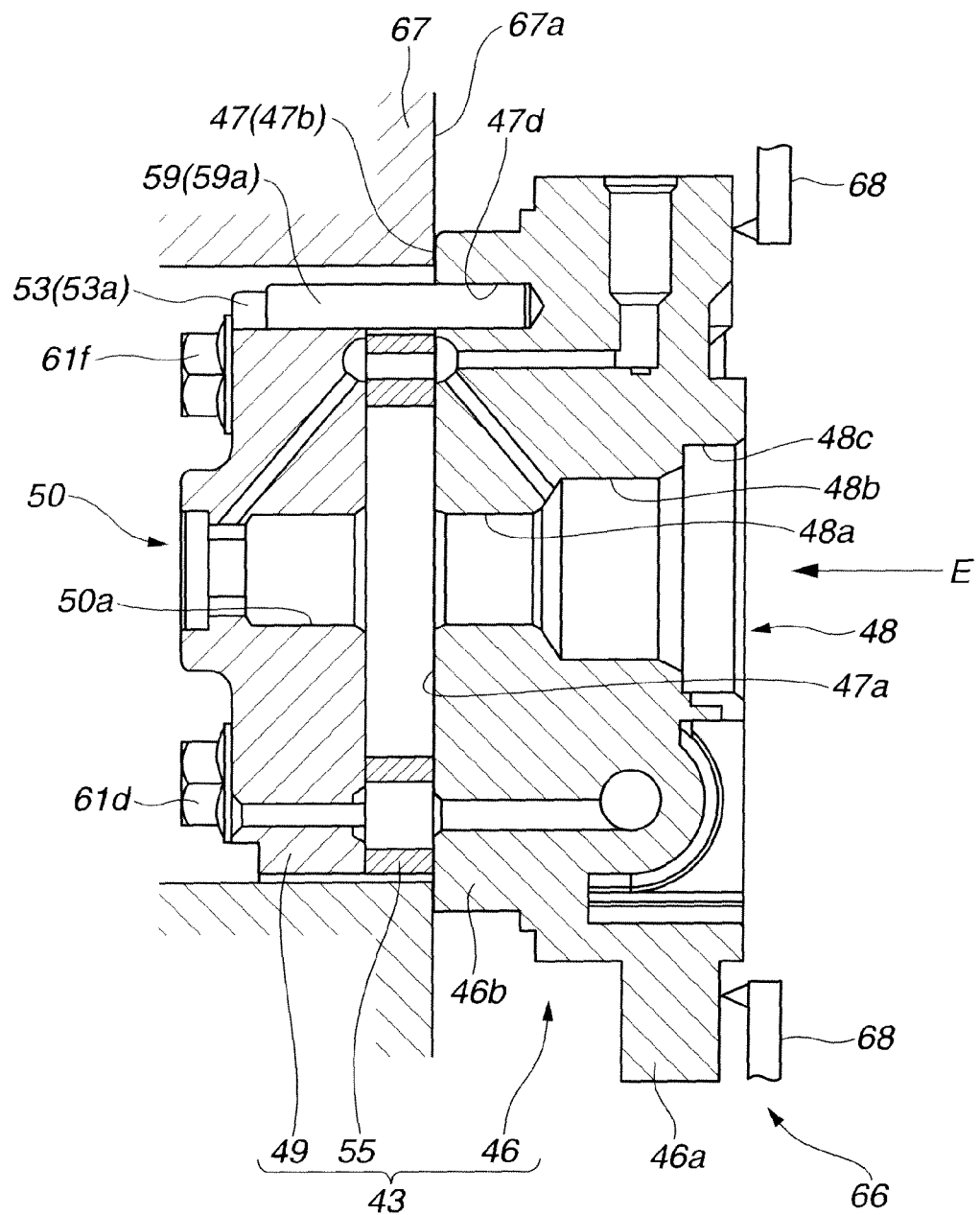
FIG. 9 is a view showing a state in which the pump housing of FIG. 7 is mounted to a work holding device of a machining apparatus.

Hereinafter, the assembly method of pump housing 43 is illustrated with reference to FIGS. 6-9. FIG. 6 is a flowchart showing an assembly process of housing 43. FIG. 7 is a view which shows a state that pump housing 43 is assembled without receiving pump element 42 and pump drive shaft 44, and that is a sectional view taken along imaginary line AOC of FIG. 5. FIG. 8 is a front view showing pump housing 43 shown in FIG. 7. FIG. 9 is a view showing a state in which pump housing 43 is mounted in a work holding device (workpiece holder) of a machining apparatus (equipment).

Pump housing 43 is assembled by a process shown in the flowchart of FIG. 6. First, cam ring 55 is mounted on inner side surface 47 of pump body 46 by being guided by first and second positioning pins 59 and 60 while first and second cam ring side positioning grooves 57 and 58 are freely mounted (fit) on first and second positioning pins 59 and 60 previously fixed in pump body 46 by the press fit. Next, pump cover 49 is mounted on cam ring 55 by being guided by first and second positioning pins 59 and 60 while first and second pump cover side positioning grooves 53 and 54 are freely mounted (fit) on first and second positioning pins 59 and 60 (step S1).

Then, as shown in FIG. 8, pressing jig 62 presses pump cover 49 while pump body 46 is fixed by a fixing jig (not shown), so that pump body 46 and pump cover 49 are relatively positioned in the radial direction (step S2).

Pressing jig 62 includes a jig body 63 arranged to be moved in the forward direction and in the rearward direction of a separating direction with respect to outer circumference surface 52 of pump cover 49 by a drive means (not shown); a pushing arm 64 including a substantially central portion (in the longitudinal direction) which is swingably connected to the end of jig body 63; and a pair of pressing rollers 65a and 65b provided at longitudinal both end portions of pressing arm 64.

Then, both pressing rollers 65a and 65b of pressing jig 62 are abutted on outer circumference surface 52 of pump cover 49 on the both sides of the above-described position P2. Pressing jig 62 is driven by the drive means (not shown) toward the radially inside of pump housing 43 so that urging force F is applied to pump cover 49. In this case, pressing rollers 65a and 65b are abutted, in the radial direction, on an axial region A1 (cf. FIG. 7) of outer circumference surface 52 of pump cover 49 which corresponds to axial positions of first and second positioning pins 59 and 60. With this, it is possible to prevent pump cover 49 from inclining to float from cam ring 55, by the urging force of pressing jig 62, and to surely position pump body 46 and pump cover 49.

In this way, when pump cover 49 is pressed, first, outer wall surface 53a of first pump cover side positioning groove 53 is abutted on cylindrical outer circumference surface 59a of first positioning pin 59, so that pump cover 49 is relatively positioned with respect to pump body 46 in the radial direction, that is, in the direction of imaginary line AOB. Then, when pump cover 49 is further pressed by urging force F from this state, the moment shown by an arrow M of FIG. 8 is generated, and pump cover 49 is swung about first positioning pin 59. With this, outer wall surface 54a of second pump cover side positioning groove 54 is abutted on cylindrical outer circumference surface 60a of second positioning pin 60. Consequently, pump cover 49 is relatively positioned with respect to pump body 46 in the swing direction. With this, the relative position between pump body 46 and pump cover 49 is uniquely determined. When pump cover 49 is swung about first positioning pin 59, pressing arm 64 is swung in accordance with the swing movement of pump cover 49.

In this way, outer wall surface 54a of second positioning groove 54 is abutted on second positioning pin 60 by a component force F1 obtained by dissolving urging force F in a direction perpendicular to D-D line connecting first and second positioning pins 59 and 60 in a state in which outer wall surfaces 53a and 54a of first and second pump cover side positioning grooves 53 and 54 are abutted on first and second positioning pins 59 and 60. In this case, second positioning pin 60 is provided at a position from the above-mentioned position P1 in the clockwise direction of FIG. 8, that is, the position which is offset in the swing direction of pump cover 49 around first positioning pin 59. Accordingly, this component force F1 is larger than a component force F2 when second positioning pin 60 is provided at the above-mentioned position P1. With this, the abutment of outer wall surface 54a of second positioning groove 54 and second positioning pin 60 is strengthened, and the pump body 46 and pump cover 49 are further surely positioned relatively. In this case, first and second positioning pins 59 and 60 are tightly fixed to pump body 46 by the press fit. Accordingly, even when outer wall surfaces 53a and 54a of first and second pump cover side positioning grooves 53 and 54 are tightly abutted, first and second positioning pins 59 and 60 are not inclined.

In this way, pump cover 49 and pump body 46 are relatively positioned. Then, pump cover 49, pump body 46 and cam ring 55 are joined by housing tightening bolts 61a-61f shown in FIG. 5 in a state in which urging force F by pressing jig 62 is applied to pump cover 49. Then, pressing jig 62 is separated from outer circumference surface 52 of pump cover 49 (step S3).

When housing tightening bolts 61a-61f are tightened, pump cover 49 may be rotated in the swing direction about housing tightening bolts 61a-61f. With this, the relative position between pump body 46 and pump cover 49 may be varied. Accordingly, one of first-third housing tightening bolts 61a-61c which are located on the right side of imaginary line AOC in the front view shown in FIG. 5 is first tightened for acting tightening torque in a direction to strengthen the abutment between outer wall surfaces 53a and 54a of first and second pump cover side positioning grooves 53 and 54 and first and second positioning pins 59 and 60. In this case, the tightening torques of housing tightening bolts 61a-61f are identical to those at the reassembly described later. With this, the deformation identical to that of the reassembly operation is applied to pump housing 43.

That is, one of first to third housing tightening bolts 61a-61c which is first tightened is selected as necessary by considering distances between first to third tightening bolts 61a-61c and first and second positioning pins 59 and 60, that is, lengths of arms of torques acted to first and second positioning pins 59 and 60 at the tightening of the bolts, as shown in FIG. 5. For example, when one of first to third housing tightening bolts 61a-61c which is first tightened is first housing tightening bolt 61a which is farthest from second positioning pin 60, the abutment between outer wall surface 54a of second pump cover side positioning groove 54 and second positioning pin 60 is particularly strengthen. On the other hand, when one of first to third housing tightening bolts 61a-61c which is first tightened is third housing tightening bolt 61c which is farthest from first positioning pin 59, the abutment between outer wall surface 53a of first pump cover side positioning groove 53 and first positioning pin 59 is particularly strengthen. Moreover, when one of first to third housing tightening bolts 61a-61c which is first tightened is second tightening bolt 61b which is located at a central position in the circumferential direction, the abutments between outer wall surfaces 53a and 54a of first and second pump cover side positioning grooves 53 and 54 and first and second positioning pins 59 and 60 are strengthen in a balanced manner, and pump body 46 and pump cover 49 further surely positioned.

As mentioned above, at steps S1-S3 (a first assembly step), pump housing 43 is assembled without assembling (the assemblage of) pump element 42 and pump drive shaft 44. Then, pump body 46 and pump cover 49 are co-processed (step S4, co-processing step).

That is, as shown in FIG. 9, first, pump housing 43 is mounted to work holding device 66 of the machining apparatus. Work holding device 66 includes a holding tool body 67 including a seat surface 67a on which machined reference surface 47b of pump housing 43 is seated; and a plurality of holding claws 68 which are arranged to approach or separate from seat surface 67a of holding member body 67. Pump body 46 is sandwiched between seat surface 67a and holding claws 68 while machined reference surface 47b of pump body 43 is seated on seat surface 67a of holding member body 67. With this, pump housing 43 is held to and positioned to work holding apparatus 66 with reference to machined reference surface 47b.

Then, as shown in an arrow E of FIG. 9, a co-processing member (tool) such as a bite and rubber (grinder) is inserted from first drive shaft insertion hole 48 of pump body 46 into pump housing 43 in a direction perpendicular to seat surface 67a of holding tool body 67. The inner circumference surfaces of first and second bearing receiving portions 48a and 50a are co-processed. After this co-processing, the inner circumference surface of large diameter portion 48c is machined in a one chuck state. With this, first and second bearing receiving portions 48a and 50a are formed substantially coaxially with each other, and large diameter portion 48c is formed substantially coaxially with first and second bearing receiving portions 48a and 50a. Moreover, first and second bearing receiving portions 48a and 50a, and large diameter portion 48c are machined with reference to machine processing reference surface 47b. Accordingly, first and second bearing receiving portions 48a and 50a, and large diameter portion 48c are formed substantially perpendicular to pump element sliding surface 47b. In this case, this one chuck state means that the co-processing of first and second bearing receiving portions 48a and 50a, and the machining of large diameter portion 48c are performed in a state in which pump housing 43 continues to be held by work holding device 66 without being detached from work holding apparatus 66.

In this way, pump body 46 and pump cover 49 are co-processed. Then, as the disassembly process, pump housing 43 is detached from work holding device 66 of the machining apparatus. Next, the joining state of pump housing 43 by housing tightening bolts 61a-61f is released, and pump body 46, pump cover 49 and cam ring 55 are separated once. Pump body 46, pump cover 49 and cam ring 55 are washed or cleaned to remove the chip and so on (step S5).

Then, as a second assembly process, a reassembly of pump housing 43 with the assemblage of pump element 42 and pump drive shaft 44 is performed.

That is, first, pump housing 43 is temporarily assembled while pump housing 43 receives pump element 42 and pump drive shaft 44 (step S6).

That is, first needle bearing NB1 and pump side seal member S2 shown in FIG. 4 is previously assembled to pump body 46. Then, cam ring 55 is mounted on inner side surface 47 of pump body 46 by being guided by first and second positioning pins 59 and 60 while first and second cam ring side positioning grooves 57 and 58 are mounted on first and second positioning pins 59 and 60.

Next, pump drive shaft 44 previously assembled with inner rotor 42a by pin 45 is inserted from the inner side surface 47's side into first drive shaft insertion hole 48 of pump body 46. Inner rotor 42a is seated on inner side surface 47 of pump body 46. Outer rotor 42b is inserted between cam ring 55 and inner rotor 42a while the external teeth of inner rotor 42a is engaged with the internal teeth of outer rotor 42b.

Then, pump cover 49 is mounted on cam ring 55 by being guided by first and second positioning pins 59 and 60 while first and second pump cover side positioning grooves 53 and 54 of pump cover 49 previously assembled with second needle bearing NB2 are mounted, respectively, on first and second positioning pins 59 and 60. With this, pump element 42 is received between pump body 46 and pump cover 49, and pump drive shaft 44 is inserted into first and second drive shaft receiving holes 48 and 50. Pump drive shaft 44 is rotatably supported by pump body 46 and pump cover 49 through first and second needle bearings NB1 and NB2 in the both holding state.

In this way, pump housing 43 is temporarily assembled. Then, pump body 46 and pump cover 49 are relatively positioned in the radial direction, like the above-mentioned step S2 (step S7). That is, both pressing rollers 65a and 65b of pressing jig 62 are abutted on the outer circumference surface of pump cover 49 at the position identical to the position at the above-described step S2 while pump body 46 is fixed by the fixing jig (not shown). Then, urging force F identical to that of the above-described step S2 is applied to pump cover 49 by pressing jig 62. With this, pump cover 49 is positioned with respect to pump body 46 by the movement identical to that of the above-described step S2, so that the relative position between pump body 46 and pump cover 49 at the co-processing (step S4) is re-created. With this, the center of first bearing receiving hole 48a of first drive shaft insertion hole 48 of pump body 46 substantially corresponds to the center of second bearing receiving portion 50a of second drive shaft insertion hole 50 of pump cover 49. Accordingly, pump drive shaft 44 becomes a posture substantially perpendicular to pump element sliding surface 47a.

Then, pump body 46, pump cover 49, and cam ring 55 are tightened together by housing tightening bolts 61a-61f in a state in which urging force F by pressing jig 62 is applied to pump cover 49. Then, pressing jig 62 is detached from outer circumference surface 52 of pump cover 49, so that the assembly of pump apparatus 10 is finished (step S8). In this case, the tightening order and the tightening torques of housing tightening bolts 61a-61f are identical to those of the above-described step S3.

Then, as shown in FIG. 2, reservoir tank 11 is mounted to the thus-assembled pump apparatus 10. The end of cylindrical portion 29a of pump drive apparatus PD is inserted into large diameter portion 48c of first drive shaft insertion hole 48 of pump apparatus 10. Then, motor drive shaft 30 of pump drive apparatus PD and pump drive shaft 44 of pump apparatus 10 are connected through shaft joint 38, so that motor pump unit 7 is finished (accomplished) by tightening pump apparatus 10 and pump drive apparatus PD by bolts (not shown).

Moreover, the thus-finished (accomplished) motor pump unit 7 is mounted to power steering apparatus 1, so that power steering apparatus is finished (accomplished).

Accordingly, in the pump apparatus according to this embodiment, at the reassembly with the assemblage of pump element 42 and pump drive shaft 44, the relative position between pump body 46 and pump cover 49 at the co-processing of first and second drive shaft insertion holes 48 and 50 is re-created. Consequently, it is possible to remarkably improve the coaxiality of first and second bearing receiving portions 48a and 50a of first and second drive shaft insertion holes 48 and 50 which are arranged to support pump drive shaft 44, without extremely increasing the working accuracy (processing accuracy) of the components such as first and second positioning pins 59 and 60, pump body 46 and pump cover 49, and without increasing the manufacturing cost.

In particular, the co-processing of pump body 46 and pump cover 49 is performed in a state in which cam ring 55 is assembled between pump body 46 and pump cover 49 and housing tightening bolts 61a-61f are tightened by the tightening torques identical to those of the reassembly, that is, in a state close to the actuation state of pump apparatus 10. Accordingly, it is possible to further improve the coaxiality of first and second bearing receiving portions 48a and 50a at the actuation of pump apparatus 10.

Moreover, in the pump apparatus according to this embodiment, first and second bearing receiving portions 48a and 48b are co-processed with reference to machine processing surface 47b formed on the same plane as pump element sliding surface 47a by the accuracy identical to that of pump element sliding surface 47b. Accordingly, it is possible to further improve the squareness of pump drive shaft 44 to pump element sliding surface 47a.

Consequently, it is possible to assemble pump drive shaft 44 to pump housing 43 in a posture substantially perpendicular to pump element sliding surface 47a. Therefore, it is possible to decrease the sliding resistance of pump element 42 at the actuation of pump apparatus 10, and to improve the mechanical efficiency. Furthermore, it is possible to decrease the load of electromotive motor 12, and to prevent the generation of galling of pump element 42.

Moreover, the machining performed on the inner circumference surface of large diameter portion 48c of first drive shaft insertion hole 48 which is arranged to position pump drive shaft 44 and motor drive shaft 30 is performed in the one-chuck state after the co-processing of first and second drive shaft insertion holes 48 and 50. Accordingly, it is possible to improve the coaxiality between pump drive shaft 44 and motor drive shaft 30, and to improve the torque transmission efficiency.

Moreover, the discharge characteristics of pump apparatus 10 in the forward rotation and in the reverse rotation become substantially identical to each other by improving the squareness of pump drive shaft 44 with respect to pump element sliding surface 47a. Furthermore, the torque transmission characteristics through shaft joint 38 in the forward rotation and in the reverse rotation become substantially identical to each other by improving the coaxiality between pump drive shaft 44 and motor drive shaft 30. Accordingly, it is possible to substantially uniformize the steering forces at the steering operation in the leftward and rightward directions, and thereby to improve the steering feeling.

Moreover, cylindrical outer circumference surface 59a of first positioning pin 59 is abutted, as the abutment surface, on outer wall surface 53a of first pump cover side positioning groove 53. Accordingly, when pressing jig 62 presses pump cover 49, the swing movement of pump cover 49 around first positioning pin 59 is smoothly performed without the large radial displacement. Consequently, it is possible to surely position pump body 46 and pump cover 49 relatively. That is, for example, when the abutment surface of first positioning pin 59 with respect to outer wall surface 53a of first pump cover side positioning groove 53 is formed into a flat shape, the center of the swing movement of pump cover 49 about first positioning pin 59 may not be determined. However, in this pump apparatus according to this embodiment, it is possible to suppress these inconvenience (disadvantage).

Moreover, cylindrical outer circumference surface 60a of second positioning pin 60 is abutted on outer wall surface 54a of second pump cover side positioning groove 54. With this, the abutment state between cylindrical outer circumference surface 60a of second positioning pin 60 and outer wall surface 54a of second pump cover side positioning groove 54 is stabilized. Accordingly, it is possible to further surely position pump body 46 and pump cover 49 relatively. That is, for example, when the abutment surface of second positioning pin 60 with respect to outer wall surface 54a of second pump cover side positioning groove 54 is formed into the flat shape, this abutment surface becomes the misaligned abutment (partial contact) with respect to outer wall surface 54a of second pump cover side positioning groove 54. With this, this abutment position may be varied. However, in the pump apparatus according to this embodiment, it is possible to suppress the generation of these inconveniences.

Furthermore, outer wall surfaces 53a and 54a of first and second pump cover side positioning grooves 53 and 54 which are arranged to position pump cover 49 with respect to pump body 46 is machined by the relatively high accuracy. Accordingly, it is possible to suppress the variation of the relative position between pump body 46 and pump cover 49, and to improve the relative position accuracies of first and second suction/discharge ports 14a and 14b with respect to pump element 42.

In the pump apparatus according to this embodiment, at step S2 of FIG. 6, pump body 46 and pump cover 49 are relatively positioned in a state in which pump body 46 is fixed to the fixing jig (not shown). Then, at step S3, pump housing 43 is held to work holding device 66 of the machining apparatus. However, the relative positioning operation of pump body 46 and pump cover 49 which corresponds to step S2 of FIG. 6 may be performed in a state in which pump body 46 is mounted to the work holding device of the machining apparatus. In this case, it is necessary to constitute the work holding device so as to enable to assemble pump housing 43. However, in this case, it is possible to omit the mounting operation of pump housing 43 to work holding device 66 after pump housing 43 is assembled. Moreover, it is possible to relatively position pump body 46 and pump cover 49 in a state close to the co-processing operation of pump body 46 and pump cover 49. Accordingly, it is possible to further improve the coaxiality between first and second bearing receiving portions 48a and 50a.

Figure 10A:
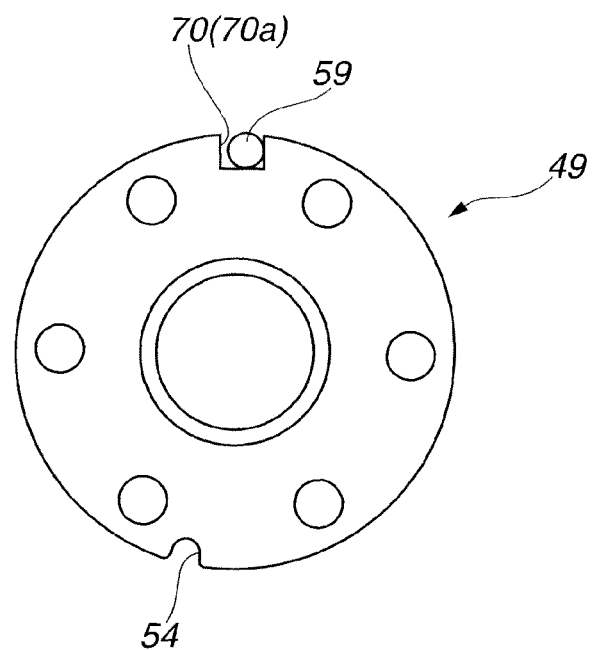
FIG. 10A is a view showing a first pump cover side positioning groove in a first variation of the first embodiment of the present invention.
Figure 10B:
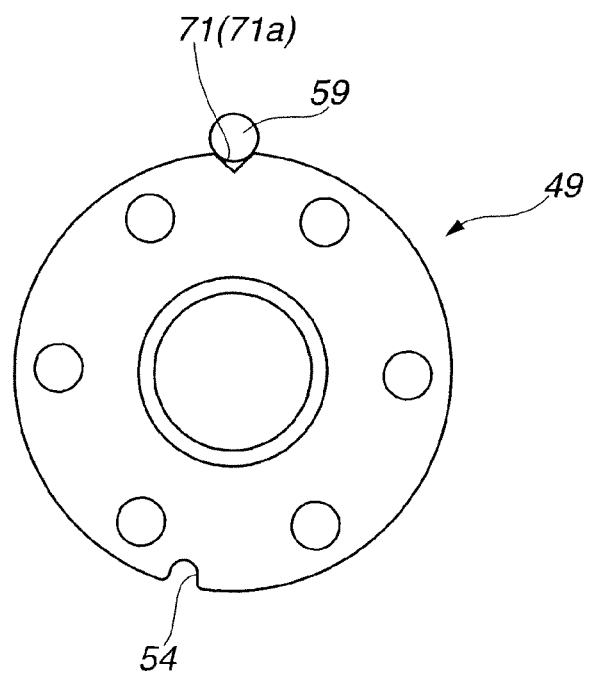
FIG. 10B is a view showing a first pump cover side positioning groove in a second variation of the first embodiment of the present invention.

Moreover, there is no need to form the outer wall surfaces of the first and second pump cover side positioning grooves into the substantially U-section. FIG. 10A is a view showing a first pump cover side positioning groove in a first variation of the first embodiment of the present invention. FIG. 10B is a view showing a first pump cover side positioning groove in a second variation of the first embodiment of the present invention. For example, as shown in FIG. 10A, an outer wall surface 70a of a first pump cover side positioning groove 71 which is the first abutment portion may be formed into an angular U-shape section or channel shape. Moreover, as shown in FIG. 10B, an outer wall surface 71a of a first pump cover side positioning groove 71 which is the first abutment portion may be formed into a substantially V-shaped section. Besides, FIGS. 10A and 10B show main parts of pump cover 49. The other parts are omitted.

That is, if pump body 46 and pump cover 49 can be relatively positioned by the abutment between the first and second pump cover side positioning grooves 53 and 54 and first and second positioning pins 59 and 60 which are counter parts, any sectional shapes of the first and second pump cover side positioning grooves 53a and 54a can employed. When the workability of the first and second pump cover side positioning grooves are considered, it is preferable that first and second pump cover side positioning grooves 53 and 54 are formed into the substantially U-shaped section, like the first embodiment, so as to easily manufacture by tools such as a milling cutter which rotates.

Figure 11:
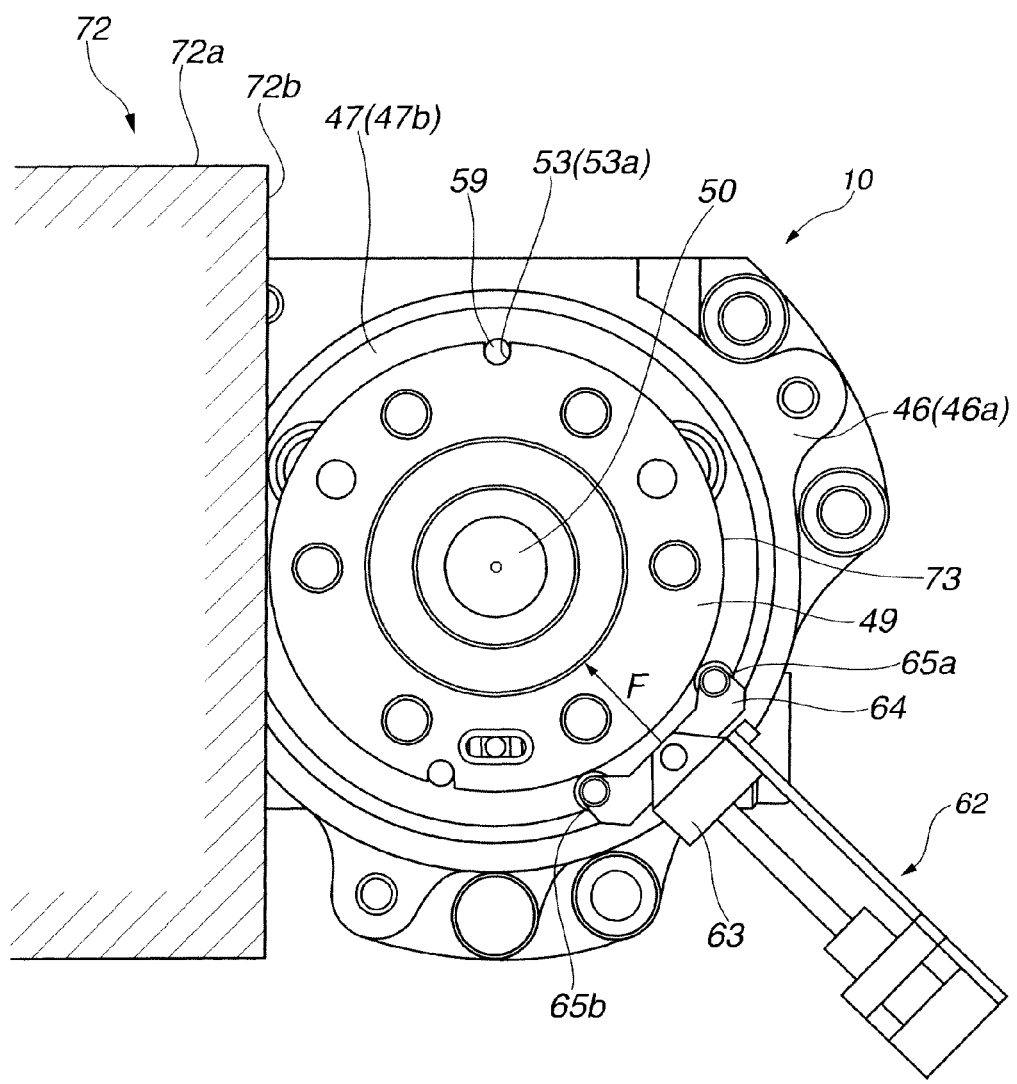
FIG. 11 is a view showing an assembly method of the housing in a third variation of the first embodiment of the present invention.

FIG. 11 is a view showing an assembly method of the housing in a third variation of the first embodiment of the present invention. As shown in FIG. 11, when pump body 46 and pump cover 49 are positioned, that is, in the process corresponding to steps S2 and S7 of FIG. 6, a positioning jig 72 having a protruding portion 72a which is a second positioning protruding portion protruding from the pump body 46's side toward the pump cover 49's side is fixed to pump body 46. Accordingly, it is possible to position pump body 46 and pump cover 49 by the abutment of an abutment surface 72b of protruding portion 72a of positioning jig 72 which is formed to direct to pump cover 49, and an outer circumference surface 73 of pump cover 49. With this, second positioning pin 60 and second pump cover side positioning groove 54 in the first embodiment are not needed.

That is, in the variation shown in FIG. 11, when urging force F is applied to pump cover 49 by pressing jig 62 for determining the relative position between pump body 46 and pump cover 49, outer side surface 53a of first pump cover side positioning groove 53 is abutted on first positioning pin 59. Moreover, outer circumference surface 73 of pump cover 49 is abutted, as the second abutment portion, on abutment surface 72b of positioning jig 72. With this, pump body 46 and pump cover 49 are uniquely positioned relatively.

Accordingly, in this variation, it is possible to attain the effects identical to the pump apparatus according to the first embodiment. Moreover, second positioning pin 60 and second pump cover side positioning groove 54 are not needed. Consequently, it is possible to simplify the structure of pump apparatus 10.

Figure 12A:
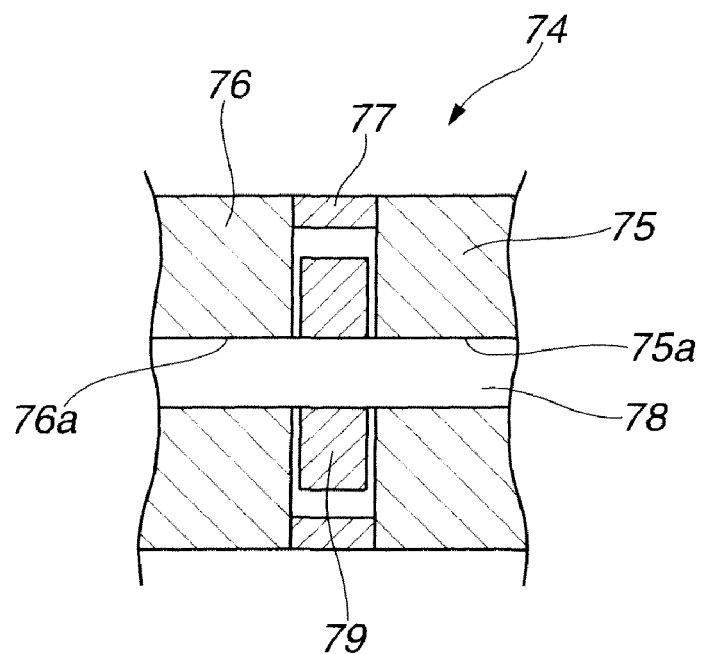
FIG. 12A is a view showing an apparatus to which an assembly method of a housing according to a second embodiment of the present invention is applied.
Figure 12B:
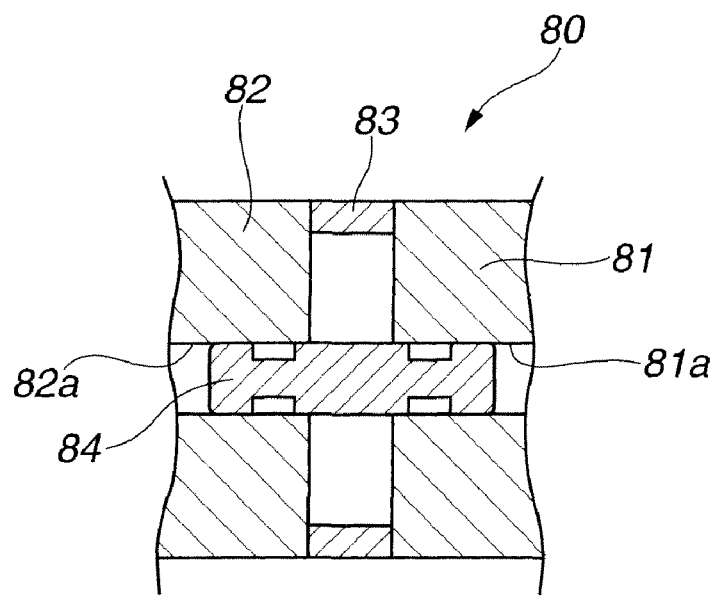
FIG. 12B is a view showing another apparatus different from the apparatus of FIG. 12A, to which the assembly method of a housing according to a third embodiment of the present invention is applied.

FIG. 12A is a view showing an apparatus to which the assembly method according to the present invention is applied in a second embodiment of the present invention. FIG. 12B is a view showing another apparatus which is different from the apparatus of FIG. 12A, and to which the assembly method according to the present invention is applied in a third embodiment of the present invention. In the first embodiment of the present invention, the assembly method of the housing is applied to the pump apparatus. Moreover, as shown in FIGS. 12A and 12B, it is possible to apply the assembly method of the housing according to the present invention to an apparatus which is other than the pump apparatus.

In housing 74 and 80 according to the second and third embodiments shown in FIGS. 12A and 12B, annular spacer rings 77 and 83 are sandwiched, respectively, between first housing members 75 or 81, and second housing members 76 or 82. In the second embodiment shown in FIG. 12A, first housing member 75 and second housing member 76 include, respectively, first and second shaft insertion holes 75a and 76a which are first and second processing portions. A fixing shaft 78 is inserted into first and second shaft insertion holes 75a and 76a. A rotation member 79 such as a gear and a pulley which is an inner member is received radially inside spacer ring 77. Rotation member 79 is rotatably mounted on fixing shaft 78.

In the assembly operation of housing 74 shown in FIG. 12A, first and second shaft insertion holes 75a and 76a are co-processed in a state in which housing 74 is assembled without receiving support shaft 78 and rotation member 79. Then, housing 74 is disassembled once. Next, the reassembly operation is performed with the assemblage of support shaft 78 and rotation member 79. In this case, the assembly operation of housing 74 is performed like the first embodiment, and housing 74 is press-assembled in the same condition in the assembly operation before the co-processing and in the reassembly operation after the co-processing. With this, it is possible to improve the coaxiality between first and second shaft insertion holes 75a and 76a, and to smoothly rotate rotation member 79.

On the other hand, in the third embodiment of the present invention shown in FIG. 12B, first housing member 81 and second housing member 82 include, respectively, first and second sliding holes 81a and 81b which are first and second processing portions. A spool 84 which is an inner member is received in first and second sliding holes 81a and 81b to be slid in the axial direction.

In the assembly operation of housing 80 shown in FIG. 12B, first and second sliding holes 81a and 82a are co-processed in a state in which housing 80 is assembled without receiving spool 84. Then, housing 80 is disassembled once. Then, the reassembly operation is performed with the assemblage of spool 84. In this case, the assembly operation of housing 80 is performed like the first embodiment. Housing 80 is press-assembled in the same condition in the assembly operation before the co-processing and in the reassembly operation after the co-processing. With this, it is possible to improve the coaxiality of first and second sliding holes 81a and 82a, and to smoothly slide spool 84.

Figure 13:
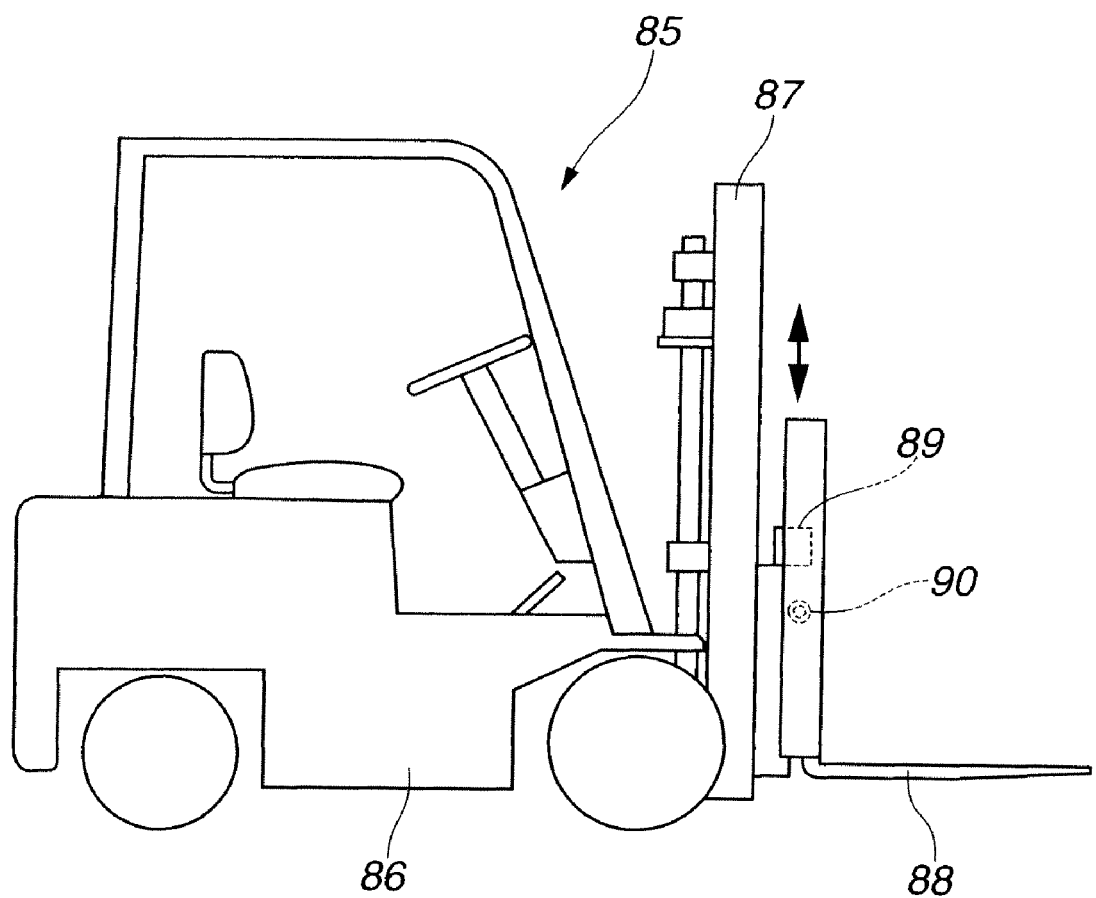
FIG. 13 is a view showing a forklift to which the pump apparatus is applied, in a fourth embodiment of the present invention.

FIG. 13 is a view showing a forklift to which the pump apparatus is applied, in a fourth embodiment of the present invention. In the first embodiment of the present invention, the pump apparatus is applied to power steering apparatus 1. Moreover, the pump apparatus according to the present invention is applicable to apparatuses other than the power steering apparatus. Specifically, as shown in FIG. 13, the pump apparatus according to the present invention is applicable to a hydraulic pressure source of a forklift.

In forklift 85 shown in FIG. 13, a fork 88 is guided in a mast 87 provided at a front portion of a vehicle body 86. Fork 88 is activated by supplying the hydraulic pressure generated in pump apparatus 89 to a hydraulic pressure cylinder 90 for a side shift. In this case, pump apparatus 89 is identical to the pump apparatus shown in FIGS. 1-5 in the first embodiment.

Accordingly, it is possible to attain the effects identical to the first embodiment.

A pump apparatus according to the present invention includes: a first housing member which includes a first drive shaft insertion hole extending in an axial direction; a second housing member which includes a second drive shaft insertion hole extending in the axial direction, and which is disposed to confront the first housing member; a pump element disposed between the first housing member and the second housing member, and arranged to suck and discharge a hydraulic fluid by rotating; a pump drive shaft rotatably inserted into the first drive shaft insertion hole and the second drive shaft insertion hole, and arranged to drive and rotate the pump element; a first abutment portion formed in the second housing member, and arranged to position the second housing member with respect to the first housing member in a radial direction by abutting, from a radially inside direction of the first housing member, on a first positioning protruding portion protruding from the first housing member toward the second housing member; a second abutment portion formed in the second housing member, and arranged to position the second housing member with respect to the first housing member in a swing direction of the second housing member about the first positioning protruding portion, by abutting, in the swing direction, on a second positioning protruding portion protruding from the first housing member toward the second housing member; and a joining member joining the first housing member and the second housing member, the first and second drive shaft insertion holes being previously co-processed in a state in which the first housing member and the second housing member are relatively positioned by abutments between the first and second positioning protruding portions and the first and second abutment portions, and the joining member joining the first housing member and the second housing member in a state in which the first housing member and the second housing member are relatively positioned by the abutments of the first and second positioning protruding portions and the first and second abutment portions so as to re-create a relative position between the first housing member and the second housing member at the co-processing.

In the pump apparatus according to the present invention, the first and second positioning protruding portions are first and second positioning pins which are formed into cylindrical shapes.

Accordingly, it is possible to stabilize the abutment state of first and second abutment portions with respect to first and second positioning pins, and to improve the accuracy of the relative positioning between the first and second housing members.

In the pump apparatus according to the present invention, the first positioning pin and the second positioning pin are inserted into the first housing by press fit.

Accordingly, first and second positioning pins are tightly fixed with respect to the first housing member. Consequently, it is possible to suppress the fluctuation (oscillation) in the inclination direction of the first and second positioning pins, and to improve the accuracy of the relative positioning between the first and second housing members.

In the pump apparatus according to the present invention, the second housing member includes a first positioning groove and a second positioning groove which are formed on an outer circumference surface of the second housing member, which extend in the axial direction, and which include, respectively, outer wall surfaces that serve, respectively, as the first abutment portion and the second abutment portion, and that are abutted on the first and second positioning pins.

Accordingly, it is possible to decrease the radial size of the second housing member relative to a case in which through holes are formed instead of the first and second positioning grooves.

In the pump apparatus according to the present invention, the outer wall surfaces of the first and second positioning grooves have, respectively, substantially U-shaped sections.

Accordingly, it is possible to readily form the first and second positioning grooves by a tool such as a milling machine (milling cutter) which rotates.

In the pump apparatus according to the present invention, the outer wall surfaces of the first and second positioning grooves are finished by machining.

Accordingly, it is possible to suppress the variation of the relative position between the first and second housing members. Consequently, when the suction port and the discharge port are formed in the first and second housing members, it is possible to improve the accuracy of the relative position of the suction port and the discharge port with respect to the pump element.

In the pump apparatus according to the present invention, the second positioning pin is disposed at a position which is offset in the swing direction from a position symmetrical to the position of the first positioning pin with respect to the first drive shaft insertion hole.

Accordingly, the abutment of the second abutment portion with respect to the second positioning pin is strengthened. Moreover, the abutment states of the first and second abutment portions with respect to the first and second positioning pins are further stabilized. Consequently, it is possible to further improve the accuracy of the relative positioning of the first and second housing members.

In the pump apparatus according to the present invention, the pump apparatus further includes an annular cam ring which is sandwiched between the first housing member and the second housing member, and which receives the pump element radially inside the cam ring; and the first and second drive shaft insertion holes are previously co-processed in a state in which the cam ring is sandwiched between the first housing member and the second housing member.

In the pump apparatus according to the present invention, the first housing member includes a pump element sliding surface which is formed on a surface of the first housing member to confront the second housing member by the machining, and on which the pump element is slid, and a machined reference surface which is formed on the same plane as the pump element sliding surface radially outside the pump element sliding surface by the machining, which exposes to an outside in a state in which the first and second housing members are relatively positioned by the abutments between the first and second positioning protruding portions and the first and second abutment portions, and which serves as a reference at the co-processing.

In the power steering apparatus according to the present invention, the first housing member includes a positioning hole formed by the machining on a surface of the first housing member opposite to the second housing member, and which is arranged to position with respect to a motor drive shaft by mounting on an electromotive motor side positioning protruding portion of the electromotive motor; and the co-processing operation of the first and second drive shaft insertion holes and the machine processing operation of the positioning hole are performed in a one chuck state.

Accordingly, it is possible to improve the coaxiality between the pump drive shaft and the motor drive shaft, and to suppress the variation between the power transmission efficiencies from the motor drive shaft to the pump drive shaft in the forward rotation and in the reverse rotation. With this, it is possible to uniformize the steering forces in the leftward direction and in the rightward direction, and to further improve the steering feeling.

A method of assembling a housing including a first housing member, a second housing member which is disposed to confront the first housing member, and which receives an inner member between the first housing member and the second housing member, a first abutment portion formed in the second housing member, and arranged to position the second housing member with respect to the first housing member in an abutment direction perpendicular to a separating direction of the first and second housing members, by abutting, in the abutment direction, on a first positioning protruding portion protruding from the first housing member toward the second housing member, and a second abutment portion formed in the second housing member, and arranged to position the second housing member with respect to the first housing member in a swing direction of the second housing member about the first positioning protruding portion, by abutting, in the swing direction, on a second positioning protruding portion protruding from the first housing member toward the second housing member, the first and second housing members being joined while the inner member is received between the first housing members after the first housing member is formed with a first processing portion and the second housing member is formed with a second processing portion, the assembly method including: a first assembly step of relatively positioning the first housing member and the second housing member by abutments of the first and second positioning protruding portions and the first and second abutment portions while the first housing member and the second housing member are assembled without receiving the inner member, and joining the first and second housing members in this state; a processing step of forming the first processing portion and the second processing portion in the first and second housing members by co-processing the first and second housing members after the first assembly step; a disassembly step of disassembling the first and second housing members after the processing step; and a second assembly step of assembling the first and second housing members after receiving the inner member, abutting the first and second positioning protruding portions and the first and second abutment portions so as to re-create the relative position between the first and second housing members at the processing step, and joining the first and second housing members in this state.

Accordingly, it is possible to re-create, at the second assembly step, the relative position relationship between the first and second housing members at the processing step by the abutment between the first and second positioning protruding portions and the first and second abutment portions. Therefore, it is possible to remarkably improve the coaxiality between the first and second drive shaft insertion holes without the necessity of the extreme increase of the processing accuracy of the components of the pump apparatus, and without the increase of the manufacturing cost.

In the assembly method according to the present invention, at the first assembly step, the first and second housing members are relatively positioned by the abutments between the first and second positioning protruding portions and the first and second abutment portions in a state in which the cam ring is sandwiched between the first and second housing members, and then the first and second housing members and the cam ring are joined.

Accordingly, the co-processing of the first and second drive shaft insertion holes is performed in a state close to the final assembly state after the second assembly step. Therefore, it is possible to improve the coaxiality between the first and second drive shaft insertion holes.

In the assembly method according to the present invention, the first housing member includes a pump element sliding surface which is formed by the machining on a surface of the first housing member to confront the second housing member, and on which the pump element is slid, and a machined reference surface which is formed on the same plane as the pump element sliding surface radially outside the pump element sliding surface, and which exposes to an outside in a state in which the first and second housing members are assembled; and the co-processing of the first and second drive shaft insertion holes at the processing step is performed in a state in which the first and second housing members are positioned with respect to a work holding device by abutting the machined reference surface on the work holding device arranged to hold the first and second housing members.

Accordingly, it is possible to machine the machined reference surface together with the pump element sliding surface by setting the machine processing reference surface which serves as a reference of the co-processing of the first and second drive shaft insertion holes, to the same plane as the pump element sliding surface formed at the relatively high accuracy.

Moreover, it is possible to improve the squareness of the first and second drive shaft insertion holes with respect to the pump element sliding surface by co-processing the first and second drive shaft insertion holes with reference to the thus-formed machined reference surface. Accordingly, it is possible to decrease the sliding resistance between the pump element and the pump element sliding surface, and to improve the mechanical efficiency of the pump apparatus. Furthermore, it is possible to suppress the galling between the pump element and the pump element sliding surface.

In the assembly method according to the present invention, at the first and second assembly steps, the first and second abutment portions are abutted, respectively, on the first and second positioning protruding portions by pressing axial regions of an outer circumference surface of the second housing member which corresponds to axial positions of the first and second positioning protruding portions and the first and second abutment portions.

With this, it is possible to stabilize the abutment state between the first and second positioning protruding portions and the first and second abutment portions, and to improve the accuracy of the relative position between the first and second housing members.

In the assembly method according to the present invention, the joining member is a plurality of housing tightening bolts provided in a circumferential direction of the first and second housing members and the cam ring, and arranged to tighten and fix the first and second housing members, and the cam ring together; and at the second assembly step, one of the housing tightening bolts to which a tightening torque is acted in a direction to strengthen the abutment between the first and second positioning protruding portions and the first and second abutment portions is first tightened.

Accordingly, it is possible to suppress the rotation of the first housing member or the second housing member with the housing tightening bolt at the tightening of the housing tightening bolt, and to improve the accuracy of the relative positioning between the first and second housing members.

In the assembly method according to the present invention, at the second assembly step, one of the housing tightening bolts to which the tightening torque is acted in a direction to strengthen the abutment between the first and second positioning protruding portions and the first and second abutment portions, and which is farthest from the second abutment portion is first tightened.

Accordingly, it is possible to lengthen the arm of the moment acted in the direction to strengthen the abutment between the second positioning protruding portion and the second abutment portion when the housing tightening bolt is first tightened at the second assembly step. Consequently, it is possible to increase the strength of the abutment of the second abutment portion with respect to the second positioning protruding portion. Therefore, it is possible to further stabilize the abutment states of the first and second abutment portions with respect to the first and second positioning pins, and to further improve the accuracy of the relative positioning between the first and second housing members.

In the assembly method according to the present invention, the joining member is a plurality of housing tightening bolts provided in a circumferential direction of the first and second housing members and the cam ring, and arranged to tighten and fix the first and second housing members and the cam ring together; and at the first assembly step, the first and second housing members are joined by all of the housing tightening bolts.

Accordingly, the co-processing at the processing step is performed in which the axial forces of the housing tightening bolts are acted to the first and second housing members, that is, a state close to the actuation state of the pump apparatus. Therefore, it is possible to further improve the coaxiality of the first and second drive shaft insertion holes at the actuation of the pump apparatus.

In the assembly method according to the present invention, at the first assembly step, the first and second housing members are relatively positioned in a state in which the first housing member is held by a work holding device of a machining apparatus arranged to hold the first housing member at the processing step.

Accordingly, it is possible to save the work to hold the first housing member by the work holding device after the first assembly step before the processing step. Moreover, it is possible to perform the processing step immediately after the first assembling step. Therefore, the first and second housing members are not out of positions (misaligned) at the handling of the first and second housing members from after the first assembling step to the processing step. Consequently, it is possible to further improve the coaxiality between the first and second drive shaft insertion holes.

In the above-described pump apparatus according to the embodiments of the present invention, when the first and second housing members are assembled while receiving the inner members or the pump element, it is possible to substantially re-create the relative position between the first and second housing members at the processing of the first and second drive shaft insertion holes or the first and second processing portions, by the abutment between the first and second positioning protruding portions and the first and second abutment portions. Accordingly, it is possible to improve the accuracy of the relative position between the first and second drive shaft insertion holes or the first and second processing portions.

The entire contents of Japanese Patent Application No. 2010-211074 filed Sep. 21, 2010 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A pump apparatus comprising:
a first housing member which includes a first drive shaft insertion hole extending in an axial direction;
a second housing member which includes a second drive shaft insertion hole extending in the axial direction, and which is disposed to confront the first housing member;
a pump element disposed between the first housing member and the second housing member, and arranged to suck and discharge a hydraulic fluid by rotating;
a pump drive shaft rotatably inserted into the first drive shaft insertion hole and the second drive shaft insertion hole, and arranged to drive and rotate the pump element;
a first abutment portion formed in the second housing member, and arranged to position the second housing member with respect to the first housing member in a radial direction by abutting, from a radially inside direction of the first housing member, on a first positioning protruding portion protruding from the first housing member toward the second housing member;
a second abutment portion formed in the second housing member, and arranged to position the second housing member with respect to the first housing member in a swing direction of the second housing member about the first positioning protruding portion, by abutting, in the swing direction, on a second positioning protruding portion protruding from the first housing member toward the second housing member; and
a joining member joining the first housing member and the second housing member,
the first and second drive shaft insertion holes being previously co-processed in a state in which the first housing member and the second housing member are relatively positioned by abutments between the first and second positioning protruding portions and the first and second abutment portions, and
the joining member joining the first housing member and the second housing member in a state in which the first housing member and the second housing member are relatively positioned by the abutments of the first and second positioning protruding portions and the first and second abutment portions so as to re-create a relative position between the first housing member and the second housing member at the co-processing.

2. The pump apparatus as claimed in claim 1, wherein the first and second positioning protruding portions are first and second positioning pins which are formed into cylindrical shapes.

3. The pump apparatus as claimed in claim 2, wherein the second housing member includes a first positioning groove and a second positioning groove which are formed on an outer circumference surface of the second housing member, which extend in the axial direction, and which include, respectively, outer wall surfaces that serve, respectively, as the first abutment portion and the second abutment portion, and that are abutted on the first and second positioning pins.

4. The pump apparatus as claimed in claim 3, wherein the outer wall surfaces of the first and second positioning grooves have, respectively, substantially U-shaped sections.

5. The pump apparatus as claimed in claim 4, wherein the outer wall surfaces of the first and second positioning grooves are finished by machining.

6. The pump apparatus as claimed in claim 2, wherein the first positioning pin and the second positioning pin are inserted into the first housing by press fit.

7. The pump apparatus as claimed in claim 2, wherein the second positioning pin is disposed at a position which is offset in the swing direction from a position symmetrical to the position of the first positioning pin with respect to the first drive shaft insertion hole.

8. The pump apparatus as claimed in claim 1, wherein the pump apparatus further includes an annular cam ring which is sandwiched between the first housing member and the second housing member, and which receives the pump element radially inside the cam ring; and the first and second drive shaft insertion holes are previously co-processed in a state in which the cam ring is sandwiched between the first housing member and the second housing member.

9. The pump apparatus as claimed in claim 1, wherein the first housing member includes a pump element sliding surface which is formed on a surface of the first housing member to confront the second housing member by the machining, and on which the pump element is slid, and a machined reference surface which is formed on the same plane as the pump element sliding surface radially outside the pump element sliding surface by the machining, which exposes to an outside in a state in which the first and second housing members are relatively positioned by the abutments between the first and second positioning protruding portions and the first and second abutment portions, and which serves as a reference at the co-processing.

10. A power steering apparatus comprising:
a power cylinder which is for a steering assist, and which includes a piston, and first and second pressure chambers formed within the power cylinder on both sides of the piston; and
a reversible pump apparatus which is driven by an electromotive motor, which includes first and second suction discharge openings connected, respectively, with the first and second pressure chambers, and which is arranged to supply a hydraulic fluid selectively to the first and second pressure chambers by controlling the electromotive motor in accordance with a steering torque inputted from a steering wheel;
the pump apparatus including;
a first housing member which includes a first drive shaft insertion hole extending in an axial direction;
a second housing member which includes a second drive shaft insertion hole extending in the axial direction, and which is disposed to confront the first housing member;
a pump element disposed between the first housing member and the second housing member, and arranged to suck and discharge the hydraulic fluid by rotating;
a pump drive shaft rotatably inserted into the first drive shaft insertion hole and the second drive shaft insertion hole, connected with a motor drive shaft of the electromagnetic motor, and arranged to drive and rotate the pump element;
a first abutment portion formed in the second housing member, and arranged to position the second housing member with respect to the first housing member in a radial direction by abutting, from a radially inside direction of the first housing member, on a first positioning protruding portion protruding from the first housing member toward the second housing member;
a second abutment portion formed in the second housing member, and arranged to position the second housing member with respect to the first housing member in a swing direction of the second housing member about the first positioning protruding portion, by abutting, in the swing direction, on a second positioning protruding portion protruding from the first housing member toward the second housing member; and
a joining member joining the first housing member and the second housing member,
the first and second drive shaft insertion holes being previously co-processed in a state in which the first housing member and the second housing member are relatively positioned by abutments between the first and second positioning protruding portions and the first and second abutment portions, and
the joining member joining the first housing member and the second housing member in a state in which the first housing member and the second housing member are relatively positioned by the abutments of the first and second positioning protruding portions and the first and second abutment portions so as to re-create a relative position between the first housing member and the second housing member at the co-processing.

11. The power steering apparatus as claimed in claim 10, wherein the first housing member includes a positioning hole formed by the machining on a surface of the first housing member opposite to the second housing member, and which is arranged to position with respect to a motor drive shaft by mounting on an electromotive motor side positioning protruding portion of the electromotive motor; and the co-processing operation of the first and second drive shaft insertion holes and the machine processing operation of the positioning hole are performed in a one chuck state.

12. A method of assembling a housing including a first housing member, a second housing member which is disposed to confront the first housing member, and which receives an inner member between the first housing member and the second housing member, a first abutment portion formed in the second housing member, and arranged to position the second housing member with respect to the first housing member in an abutment direction perpendicular to a separating direction of the first and second housing members, by abutting, in the abutment direction, on a first positioning protruding portion protruding from the first housing member toward the second housing member, and a second abutment portion formed in the second housing member, and arranged to position the second housing member with respect to the first housing member in a swing direction of the second housing member about the first positioning protruding portion, by abutting, in the swing direction, on a second positioning protruding portion protruding from the first housing member toward the second housing member, the first and second housing members being joined while the inner member is received between the first housing members after the first housing member is formed with a first processing portion and the second housing member is formed with a second processing portion, the assembly method comprising:
a first assembly step of relatively positioning the first housing member and the second housing member by abutments of the first and second positioning protruding portions and the first and second abutment portions while the first housing member and the second housing member are assembled without receiving the inner member, and joining the first and second housing members in this state;
a processing step of forming the first processing portion and the second processing portion in the first and second housing members by co-processing the first and second housing members after the first assembly step;

a disassembly step of disassembling the first and second housing members after the processing step; and a second assembly step of assembling the first and second housing members after receiving the inner member, abutting the first and second positioning protruding portions and the first and second abutment portions so as to re-create the relative position between the first and second housing members at the processing step, and joining the first and second housing members in this state.

13. The assembly method as defined in claim 12, wherein the housing is for a pump apparatus arranged to suck and discharge a hydraulic fluid; the pump apparatus includes an inner rotor which is disposed between the first housing member and the second housing member, which includes a plurality of external teeth, and which constitutes a part of the inner member, an outer rotor which is provided radially outside the inner rotor, which is formed into an annular shape, which includes a plurality of internal teeth formed on an inner circumference surface, which forms pump chambers between the inner rotor and the outer rotor, and which constitutes a part of the inner member, a cam ring which is provided radially outside the outer rotor, which is formed into an annular shape, which rotatably supports the outer rotor therein, which is sandwiched between the first housing member and the second housing member to liquid-tightly surround the pump chambers, a drive shaft which is rotatably supported by the first housing member and the second housing member, a first drive shaft insertion hole which is the first processing portion, which is formed in the first housing member, and into which the drive shaft is inserted, a second drive shaft insertion hole which is the second processing portion, which is formed in the second housing, and into which the drive shaft is inserted; and inner circumference surfaces of the first drive shaft insertion hole and the second drive shaft insertion hole are formed by the machining at the processing step.

14. The assembly method as claimed in claim 13, wherein the joining member is a plurality of housing tightening bolts provided in a circumferential direction of the first and second housing members and the cam ring, and arranged to tighten and fix the first and second housing members, and the cam ring together; and at the second assembly step, one of the housing tightening bolts to which a tightening torque is acted in a direction to strengthen the abutment between the first and second positioning protruding portions and the first and second abutment portions is first tightened.

15. The assembly method as claimed in claim 14, wherein at the second assembly step, one of the housing tightening bolts to which the tightening torque is acted in a direction to strengthen the abutment between the first and second positioning protruding portions and the first and second abutment portions, and which is farthest from the second abutment portion is first tightened.

16. The assembly method as defined in claim 13, wherein at the first assembly step, the first and second housing members are relatively positioned by the abutments between the first and second positioning protruding portions and the first and second abutment portions in a state in which the cam ring is sandwiched between the first and second housing members, and then the first and second housing members and the cam ring are joined.

17. The assembly method as claimed in claim 13, wherein the first housing member includes a pump element sliding surface which is formed by the machining on a surface of the first housing member to confront the second housing member, and on which the pump element is slid, and a machined reference surface which is formed on the same plane as the pump element sliding surface radially outside the pump element sliding surface, and which exposes to an outside in a state in which the first and second housing members are assembled; and the co-processing of the first and second drive shaft insertion holes at the processing step is performed in a state in which the first and second housing members are positioned with respect to a work holding device by abutting the machined reference surface on the work holding device arranged to hold the first and second housing members.

18. The assembly method as claimed in claim 13, wherein at the first and second assembly steps, the first and second abutment portions are abutted, respectively, on the first and second positioning protruding portions by pressing axial regions of an outer circumference surface of the second housing member which corresponds to axial positions of the first and second positioning protruding portions and the first and second abutment portions.

19. The assembly method as claimed in claim 13, wherein the joining member is a plurality of housing tightening bolts provided in a circumferential direction of the first and second housing members and the cam ring, and arranged to tighten and fix the first and second housing members and the cam ring together; and at the first assembly step, the first and second housing members are joined by all of the housing tightening bolts.

20. The assembly method as claimed in claim 13, wherein at the first assembly step, the first and second housing members are relatively positioned in a state in which the first housing member is held by a work holding device of a machining apparatus arranged to hold the first housing member at the processing step.

\* \* \* \* \*